US012619678B2

(12) United States Patent
Rossi et al.

(10) Patent No.: US 12,619,678 B2
(45) Date of Patent: May 5, 2026

(54) ACCELERATION OF 1X1 CONVOLUTIONS IN CONVOLUTIONAL NEURAL NETWORKS

(71) Applicants: STMICROELECTRONICS S.r.l., Agrate Brianza (IT); STMicroelectronics International N.V., Geneva (CH)

(72) Inventors: Michele Rossi, Bareggio (IT); Thomas Boesch, Rovio (CH); Giuseppe Desoli, San Fermo Della Battaglia (IT)

(73) Assignees: STMICROELECTRONICS S.r.l., Agrate Brianza (IT); STMicroelectronics International N.V., Geneva (CH)

( * ) Notice: Subject to any disclaimer, the term of this patent is extended or adjusted under 35 U.S.C. 154(b) by 902 days.

(21) Appl. No.: 17/847,817

(22) Filed: Jun. 23, 2022

(65) Prior Publication Data

US 2023/0418559 A1    Dec. 28, 2023

(51) Int. Cl.
G06F 17/15        (2006.01)
(52) U.S. Cl.
CPC .................................. G06F 17/153 (2013.01)
(58) Field of Classification Search
CPC ............ G06F 17/15–16; G06F 9/3893; G06N 3/0464; G06N 3/063; G06N 3/082
See application file for complete search history.

(56) References Cited

U.S. PATENT DOCUMENTS 5,189,665 A    2/1993    Niehaus et al.
5,506,815 A    4/1996    Hsieh et al.

5,768,613 A    6/1998    Asghar
5,996,058 A    11/1999    Song et al.
6,011,779 A    1/2000    Wills
6,668,290 B1    12/2003    Nelson
7,737,994 B1    6/2010    Wasserman et al.
(Continued)

FOREIGN PATENT DOCUMENTS

CN    101578590 A    11/2009
CN    101739241 A    6/2010
(Continued)

OTHER PUBLICATIONS

"CS 179 Lecture 4: GPU Compute Architecture," Slideshow Presentation, 2015, 29 pages.
(Continued)

*Primary Examiner* — Matthew D Sandifer
(74) *Attorney, Agent, or Firm* — Seed IP Law Group LLP

(57)        ABSTRACT

A convolutional accelerator includes a feature line buffer, a kernel buffer, a multiply-accumulate cluster, and mode control circuitry. In a first mode of operation, the mode control circuitry stores feature data in a feature line buffer and stores kernel data in a kernel buffer. The data stored in the buffers is transferred to the MAC cluster of the convolutional accelerator for processing. In a second mode of operation the mode control circuitry stores feature data in the kernel buffer and stores kernel data in the feature line buffer. The data stored in the buffers is transferred to the MAC cluster of the convolutional accelerator for processing. The second mode of operation may be employed to efficiently process 1×N kernels, where N is an integer greater than or equal to 1.

24 Claims, 25 Drawing Sheets

(56) References Cited

U.S. PATENT DOCUMENTS

| | | |
|---|---|---|
| 7,782,873 B2 | 8/2010 | Sharma et al. |
| 7,840,403 B2 | 11/2010 | Mehrotra et al. |
| 8,131,659 B2 | 3/2012 | Xu et al. |
| 9,020,276 B2 | 4/2015 | Vigliar et al. |
| 9,294,097 B1 | 3/2016 | Vassiliev |
| 9,294,403 B2 | 3/2016 | Mejia et al. |
| 9,436,637 B2 | 9/2016 | Kommanaboyina |
| 9,652,390 B2 | 5/2017 | Gu et al. |
| 10,078,620 B2 | 9/2018 | Farabet et al. |
| 10,296,829 B2 | 5/2019 | Mostafa et al. |
| 10,394,929 B2 | 8/2019 | Tsai et al. |
| 10,417,364 B2 | 9/2019 | Boesch et al. |
| 10,417,560 B2 | 9/2019 | Henry et al. |
| 10,438,115 B2 | 10/2019 | Henry et al. |
| 10,452,605 B2 | 10/2019 | Wang et al. |
| 10,482,155 B2 | 11/2019 | Werner et al. |
| 10,546,211 B2 | 1/2020 | Shacham et al. |
| 10,552,222 B2 | 2/2020 | Wang et al. |
| 10,586,148 B2 | 3/2020 | Henry et al. |
| 10,643,129 B2 | 5/2020 | Chen et al. |
| 11,003,985 B2 | 5/2021 | Kim et al. |
| 2002/0145779 A1 | 10/2002 | Strasser et al. |
| 2003/0086421 A1 | 5/2003 | Awsienko et al. |
| 2004/0158623 A1 | 8/2004 | Avida et al. |
| 2005/0138582 A1 | 6/2005 | So et al. |
| 2005/0183055 A1 | 8/2005 | Herrera |
| 2005/0268070 A1 | 12/2005 | Baxter |
| 2010/0005238 A1 | 1/2010 | Jeddeloh et al. |
| 2010/0061726 A1 | 3/2010 | Barbarossa et al. |
| 2010/0077079 A1 | 3/2010 | Xu et al. |
| 2010/0115249 A1 | 5/2010 | Paltashev et al. |
| 2011/0029471 A1 | 2/2011 | Chakradhar et al. |
| 2012/0287344 A1 | 11/2012 | Choi et al. |
| 2012/0303932 A1 | 11/2012 | Farabet et al. |
| 2013/0156278 A1 | 6/2013 | Kim et al. |
| 2015/0046674 A1 | 2/2015 | Barry et al. |
| 2015/0170021 A1 | 6/2015 | Lupon et al. |
| 2015/0212955 A1 | 7/2015 | Easwaran |
| 2015/0261702 A1 | 9/2015 | Culurciello et al. |
| 2016/0092484 A1 | 3/2016 | Finkler |
| 2016/0148004 A1 | 5/2016 | Bakke et al. |
| 2016/0179434 A1 | 6/2016 | Herrero Abellanas et al. |
| 2016/0217101 A1 | 7/2016 | Johns et al. |
| 2016/0344629 A1 | 11/2016 | Gray |
| 2016/0379109 A1 | 12/2016 | Chung et al. |
| 2016/0379115 A1 | 12/2016 | Burger et al. |
| 2017/0011006 A1 | 1/2017 | Saber et al. |
| 2017/0116495 A1 | 4/2017 | Nomura et al. |
| 2017/0262407 A1 | 9/2017 | Wang et al. |
| 2018/0032857 A1 | 2/2018 | Lele et al. |
| 2018/0046900 A1 | 2/2018 | Dally et al. |
| 2018/0046906 A1 | 2/2018 | Dally et al. |
| 2018/0076918 A1 | 3/2018 | Boduch et al. |
| 2018/0113649 A1 | 4/2018 | Shafiee Ardestani et al. |
| 2018/0121796 A1 | 5/2018 | Deisher et al. |
| 2018/0129935 A1 | 5/2018 | Kim et al. |
| 2018/0157970 A1 | 6/2018 | Henry et al. |
| 2018/0189063 A1 | 7/2018 | Fleming et al. |
| 2018/0189215 A1 | 7/2018 | Boesch et al. |
| 2018/0189229 A1 | 7/2018 | Desoli et al. |
| 2018/0189231 A1 | 7/2018 | Fleming, Jr. et al. |
| 2018/0189424 A1 | 7/2018 | Boesch et al. |
| 2018/0189641 A1 | 7/2018 | Boesch et al. |
| 2018/0189642 A1 | 7/2018 | Boesch et al. |
| 2018/0189981 A1 | 7/2018 | Singh et al. |
| 2018/0197084 A1 | 7/2018 | Kim et al. |
| 2018/0204110 A1 | 7/2018 | Kim et al. |
| 2018/0218275 A1 | 8/2018 | Arrigoni et al. |
| 2018/0255385 A1 | 9/2018 | Djordjevic et al. |
| 2018/0336468 A1 | 11/2018 | Kadav et al. |
| 2019/0026626 A1 | 1/2019 | Du et al. |
| 2019/0266479 A1 | 8/2019 | Singh et al. |
| 2019/0266485 A1 | 8/2019 | Singh et al. |
| 2019/0266784 A1 | 8/2019 | Singh et al. |
| 2019/0340314 A1 | 11/2019 | Boesch et al. |
| 2019/0340488 A1 | 11/2019 | Fishel et al. |
| 2019/0340508 A1 | 11/2019 | Liu et al. |
| 2019/0377840 A1 | 12/2019 | Boesch et al. |
| 2020/0272779 A1 | 8/2020 | Boesch et al. |
| 2020/0293487 A1 | 9/2020 | Anderson et al. |
| 2020/0364288 A1 | 11/2020 | Wen et al. |
| 2021/0073450 A1 | 3/2021 | Boesch et al. |
| 2021/0319290 A1 | 10/2021 | Mills et al. |
| 2021/0397933 A1 | 12/2021 | Boesch et al. |

FOREIGN PATENT DOCUMENTS

| | | | |
|---|---|---|---|
| CN | 105247821 A | 1/2016 | |
| CN | 105659099 A | 6/2016 | |
| CN | 105892989 A | 8/2016 | |
| CN | 106951961 A | 7/2017 | |
| CN | 106951395 B | 8/2018 | |
| CN | 108509978 A | 9/2018 | |
| CN | 109255429 A | 1/2019 | |
| CN | 106228240 B | 9/2020 | |
| CN | 111431825 B | 3/2021 | |
| CN | 113807330 B | 3/2022 | |
| EP | 1087533 A1 | 3/2001 | |
| EP | 3319015 A1 * | 5/2018 | ............... G06N 3/08 |
| EP | 3346423 A1 | 7/2018 | |
| WO | WO 9602895 A1 | 2/1996 | |
| WO | WO 2018120019 A1 | 7/2018 | |
| WO | WO 2019045883 A1 | 3/2019 | |
| WO | WO 2019093234 A1 | 5/2019 | |
| WO | WO-2023140778 A1 * | 7/2023 | ........... G06N 3/0464 |

OTHER PUBLICATIONS

Abdelgawad et al., "High Level Synthesis of Canny Edge Detection Algorithm on Zynq Platform," *International Journal of Computer, Electrical, Automation, Control and Information Engineering* 9(1):148-152, 2015.

Alawad et al., "Stochastic-Based Deep Convolutional Networks with Reconfigurable Logic Fabric," *IEEE Transactions on Multi-Scale Computing Systems* 2(4):242-256, 2016.

Albericio et al., "Bit-Pragmatic Deep Neural Network Computing," Oct. 20, 2016. (12 pages).

Boo et al., Compression of Deep Neural Networks with Structured Sparse Ternary Coding, *Journal of Signal Processing Systems* 91:1009-1019, Nov. 6, 2018.

Cavigelli et al., "Origami: A 803 GOp/s/W Convolutional Network Accelerator," *IEEE Transactions on Circuits and Systems for Video Technology* 27(11):2461-2475, 2017.

Cesur et al., "On an Improved FPGA Implementation of CNN-based Gabor-Type filters," *IEEE Transactions on Circuits and Systems—II Express Briefs* 59(11):815-819, 2012.

Chang et al., "Mitigating Asymmetric Nonlinear Weight Update Effects in Hardware Neural Network Based on Analog Resistive Synapse," *IEEE Journal on Emerging and Selected Topics in Circuits and Systems* 8(1):116-124, 2018.

Chen et al., "A High-Throughput Neural Network Accelerator," IEEE Micro 35(3):24-32, May 2015.

Chen et al., "DaDianNao: A Machine-Learning Supercomputer," 2014 47th Annual IEEE/ACM International Symposium on Microarchitecture, Dec. 13-17, 2014, Cambridge, United Kingdom, 14 pages.

Chen et al., "DianNao: A Small-Footprint High-Throughput Accelerator for Ubiquitous Machine-Learning," Proceedings of the 19th international conference on Architectural support for programming languages and operating systems (ASPLOS), 2014, pp. 269-283.

Chen et al., "Eyeriss: An Energy-Efficient Reconfigurable Accelerator for Deep Convolutional Neural Networks," 2016 IEEE International Solid-State Circuits Conference, Jan. 31-Feb. 4, 2016, San Francisco, CA, 3 pages.

Cheung, "The Cross Bar Switch," Downloaded on Sep. 3, 2019 from www.mathcs.emory.edu/-cheung/Courses/355/Syllabus/90-parallel/CrossBar.html.

Chi et al., "Prime: A Novel Processing-in-Memory Architecture for Neural Network Computation in ReRAM-Based Main Memory,"

(56) References Cited

OTHER PUBLICATIONS

Jun. 18-22, 2016, ACM/IEEE 43rd Annual International Symposium on Computer Architecture (ISCA), pp. 27-39.

Choudhary et al., "Netra: A Hierarchical and Partitionable Architecture for Computer Vision Systems," *IEEE Transactions on Parallel and Distributed Systems* 4(10):1092-1104, 1993.

Choudhary, "Parallel Architectures and Parallel Algorithms for Integrated Vision Systems," Thesis, University of Illinois at Urbana-Champaign, Champaign, Illinois, 200 pages.

Conti et al., "A Ultra-Low-Energy Convolution Engine for Fast Brain-Inspired Vision in Multicore Clusters," *Automations & Test in Europe Conference & Exhibition*, Mar. 9-13, 2015, Grenoble, France, pp. 683-688.

Debole et al., "FPGA-Accelerator System for Computing Biologically Inspired Feature Extraction Models," *2011 Conference Record of the Forty Fifth Asilomar Conference on Signals, Systems and Computers(ASILOMAR)*, Nov. 6-9, 2011, Pacific Grove, California, pp. 751-755.

Dehon et al., "Stream computations organized for reconfigurable execution, " *Microprocessors and Microsystems* 30(6):334-354, 2006.

Desoli et al., "14.1: A 2.9TOPS/W Deep Convolutional Neural Network SoC in FD-SOI 28nm for Intelligent Embedded Systems," *IEEE International Solid-State Circuits Conference (ISSCC)*, San Francisco, California, Feb. 5-9, 2017, pp. 238-239. (3 pages).

DiCecco et al., "Caffeinated FPGAs: FPGA Framework for Convolutional Neural Networks," *arXiv:1609.09671*, 8 pages, 2016.

Du et al., "ShiDianNao: Shifting Vision Processing Closer to the Sensor," *2015 ACM/IEEE 42nd Annual International Symposium on Computer Architecture (ISCA)*, Portland, Oregon, Jun. 13-17, 2015, pp. 92-104.

Dundar, "Learning from minimally labeled data with accelerated convolutional neural networks," Doctoral Thesis, Purdue University, West Lafayette, Indiana, 2016, 150 pages.

Extended European Search Report, dated May 18, 2018, for European Application No. 17196986.8—1221, 11 pages.

Extended European Search Report, dated May 18, 2018, for European Application No. 17197117.9—1221, 15 pages.

Extended European Search Report, dated May 23, 2018, for European Application No. 17197028.8—1221, 15 pages.

Extended European Search Report, dated May 7, 2018, for European Application No. 17197155.9—1221, 10 pages.

Extended European Search Report, dated May 9, 2018, for European Application No. 17197096.5—1221, 12 Pages.

Gokhale et al., "A 240 G-ops/s Mobile Coprocessor for Deep Neural Networks (Invited Paper)," *The IEEE Conference on Computer Vision and Pattern Recognition (CVPR) Workshop*, Columbus, Ohio, Jun. 23-28, 2014, pp. 696-701.

Gong et al., "Compressing Deep Convolutional Networks using Vector Quantization," arXiv:1412.6115 [cs.CV], Dec. 2014, 10 pages.

Graf et al., "A Massively Parallel Digital Learning Processor," *Advances in Neural Information Processing Systems (NIPS)*, pp. 529-536, 2009.

Gray et al., "MOS Operational Amplifier Design—A Tutorial Overview," *IEEE Journal of Solid-State Circuits SC-17*(6):969-982, Dec. 1982.

Guo et al., "Angel-Eye: A Complete Design Flow for Mapping CNN onto Customized Hardware," 2016 IEEE Computer Society Annual Symposium on VLSI (ISVLSI), Jul. 11, 2016, pp. 24-29.

Gysel et al., "Hardware-Oriented Approximation of Convolutional Neural Networks." *arXiv:1604.03168*, 8 pages, 2016.

Huang et al., "A Vector-Quantization Compression Circuit With On-Chip Learning Ability for High-Speed Image Sensor," *IEEE Access* 5:22132-22143, 2017.

Huang, et al., "eCNN: A Block-Based and Highly Parallel CNN Accelerator for Edge Inference", MICRO-52, 2019, 14 pages.

Jagannathan et al., "Optimizing Convolutional Neural Network on DSP," IEEE International Conference on Consumer Electronics, Jan. 7-11, 2016, Las Vegas, Nevada, pp. 371-372.

Jain, "Parallel Processing With the TMS320C40 Parallel Digital Signal Processor," Texas Instruments, SPRAO53, pp. 1-32, 1994 (34 pages).

Jin et al., "An Efficient Implementation of Deep Convolutional Neural Networks on a Mobile Coprocessor," *57th International Midwest Symposium on Circuits and Systems (MWSCAS)*, Aug. 3-6, 2014, College Station, Texas, pp. 133-136.

Koscielnicki, "nVidia Hardware Documentation," Release git, Dec. 16, 2016, 631 pages.

Krizhevsky et al., "ImageNet Classification with Deep Convolutional Neural Networks," 25th International Conference on Neural Information Processing Systems, Dec. 3-6, 2012, Lake Tahoe, Nevada, 9 pages.

Kurugöllü et al., "Advanced educational Parallel DSP system based on TMS320C25 Processors," *Microprocessors and Microsystems* 19(3):147-156, 1995.

LeCun et al., "Deep Learning Tutorial," Slideshow Presentation, 2013, 204 pages.

LeCun et al., "Deep Learning: Nature Review," Slideshow Presentation, 2016, 44 pages.

LeCun et al., "Gradient-Based Learning Applied to Document Recognition," *Proceedings of the IEEE* 86(11):2278-2324, Nov. 1998.

Lee et al., "Convolutional Neural Network Accelerator with Vector Quantization," IEEE International Symposium on Circuits and Systems (ISCAS), May 26, 2019, pp. 1-5.

Lee, "Deep Learning Methods for Vision," Slideshow Presentation, 2012, 102 pages.

Lei et al., "SCADIS: A Scalable Accelerator for Data-Intensive String Set Matching on FPGAs," IEEE TrustCom-BigDataSE-ISPA, Aug. 23-26, 2016, Tianjin, China, pp. 1190-1197.

Lenart, "Design of Reconfigurable Hardware Architectures for Real-time Applications," thesis, Lund University, Lund, Sweden, 2008, 195 pages.

Li et al., "A High Performance FPGA-based Accelerator for Large-Scale Convolutional Neural Networks," 1-9, 2016.

Lian, "A Framework for FPGA-Based Acceleration of Neural Network Inference with Limited Numerical Precision via High-Level Synthesis With Streaming Functionality," Thesis, University of Toronto, Toronto, Ontario, Canada, 2016, 117 pages.

Liu et al., "Pruning of Winograd and FFT Based Convolution Algorithm," 1-7, 2016.

Lloyd "Least Squares Quantization in Pcm," *IEEE Transactions on Information Theory IT-28*(2):129-137, 1982.

Matteucci, "Deep Learning—Introduction," Slideshow Presentation, 2015, 79 pages.

Meloni et al., "A High-Efficiency Runtime Reconfigurable IP for CNN Acceleration on a Mid-Range All-Programmable SoC," International Conference on ReConFigurable Computing and FPGAs (ReConFig), Nov. 30-Dec. 2, 2016, Cancun, Mexico, 8 pages.

Moctar et al., "Routing Algorithms for FPGAS with Sparse Intra-Cluster Routing Crossbars," 22nd International Conference on Field Programmable Logic and Applications (FPL), Aug. 29-31, 2012, Oslo, Norway, pp. 91-98.

Monson et al., "Implementing High-Performance, Low-Power FPGA-based Optical Flow Accelerators in C," 24th International Conference on Application-Specific Systems, Architectures and Processors (ASAP), Jun. 5-7, 2013, Washington, DC, 7 pages.

Nair et al., "Rectified Linear Units Improve Restricted Boltzmann Machines," Proceedings of the 27th International Conference on Machine Learning, Haifa, Israel, Jun. 21, 2010, 8 pages.

Nvidia, "NVIDIA's Next Generation CUDA Compute Architecture: Fermi™," Whitepaper, 2009, 22 pages.

Paulino, "Generation of Custom Run-time Reconfigurable Hardware for Transparent Binary Acceleration," dissertation, Faculdade de Engenharia da Universidade do Porto, Jun. 2016. (202 pages).

Porter et al., "Lucas-Kanade Optical Flow Accelerator," MIT 6.375, May 11, 2011, 22 pages.

Qin et al., "How Convolutional Neural Networks See the World—A Survey of Convolutional Neural Network Visualization Methods," *Mathematical Foundations of Computing* 1(2):149-180, 2018 (32 pages).

(56) References Cited

OTHER PUBLICATIONS

Qiu et al., "A Hardware Accelerator with Variable Pixel Representation & Skip Mode Prediction for Feature Point Detection Part of SIFT Algorithm," 2009 IAPR Conference on Machine Vision Applications, May 20-22, 2009, Yokohama, Japan, 4 pages.

Rahman et al., "Efficient FPGA Acceleration of Convolutional Neural Networks Using Logical-3D Compute Array," *Design, Automation & Test in Europe Conference & Exhibition*, Mar. 14-18, 2016, Dresdon, Germany, pp. 1393-1398.

Roque et al., "Adapting the Sobel Edge Detector and Canny Edge Extractor for iPhone 3GS architecture," 17th International Conference on Systems, Signals and Image Processing, Jun. 17-19, 2010, Rio de Janeiro, Brazil, 4 pages.

Sedcole, "Reconfigurable Platform-Based Design in FPCGAs for Video Image Processing," doctoral thesis, University of London, London, UK, 2006, 206 pages.

Shen et al., "Maximizing CNN Accelerator Efficiency Through Resource Partitioning," Jun. 30, 2016. (12 pages).

Shen, et al., "Escher: A Cnn Accelerator with Flexible Buffering to Minimize Off-Chip Transfer", 2017 IEEE 25th Annual International Symposium on Field-Programmable Custom Computing Machines (FCCM), Napa, CA, 2017, pp. 93-100.

Shi et al., "A Locality Aware Convolutional Neural Networks Accelerator," *Euromicro Conference on Digital System Design*, Aug. 26-28, 2015, Funchal, Portugal, pp. 591-598.

Sim et al., "A 1.42TOPS/W Deep Convolutional Neural Network Recognition Processor for Intelligent IoE Systems," 2016 IEEE International Solid-State Circuits Conference, Jan. 31-Feb. 4, 2016, San Francisco, CA, 3 pages.

Stensland, "INF5063—GPU & CUDA," Slideshow Presentation, 2011, 44 pages.

Stenström, "Reducing Contention in Shared-Memory Multiprocessors," *Computer 21*(11):26-37, 1988.

Venieris et al., "fpgaConvNet: A Framework for Mapping Convolutional Neural Networks on FPGAs," *IEEE 24th Annual International Symposium on Field-Programmable Custom Computing Machines (FCCM)*, IEEE Computer Society, Washington DC, May 1-3, 2016, pp. 40-47.

Wang et al., "DLAU: A Scalable Deep Learning Accelerator Unit on FPGA" *IEEE Transactions on Computer-Aided Design of Integrated Circuits and Systems 36*(3):513-517, 2017.

Wang, et al., "PipeCNN: An OpenCL-Based FPGA Accelerator for Large-Scale Convolution Neuron Networks", 2017 International Conference on Field Programmable Technology (ICFPT), Melbourne, VIC, 2017, pp. 279-282.

Wu et al., "Accelerator Design for Vector Quantized Convolutional Neural Network," IEEE International Conference on Artificial Intelligence Circuits and Systems, Mar. 18-20, 2019, Hsinchu, Taiwan, ppg 46-50.

Xia et al., "Dynamic Look-up Table Method for Optimizing the Training of Deep Neural Networks on Many-Core Architecture," IEEE 7th International Conference on Computer Science and Network Technology, Oct. 19-20, 2019, Dalian, China, ppg. 216-225.

Yao et al., "Hardware-Friendly Convolutional Neural Network with Even-No. Filter Size," Workshop track—ICLR 2016, 4 pages, 2016.

Yin, et al. "Parana: A Parallel Neural Architecture Considering Thermal Problem of 3D Stacked Memory", IEEE Transactions on Parallel and Distributed Systems, vol. 29, 2018, 15 pages.

Yu et al., "FPGA-based Accelerator for Convolutional Neural Network," *Computer Engineering 43*(1):109-119, 2017 (with English abstract).

Zamanidoost et al., "Low Area Overhead In-situ Training Approach for Memristor-Based Classifier," Proceedings of the 2015 IEEE/ ACM International Symposium on Nanoscale Architectures (NANOARCH'15), Jul. 8-10, 2015, Boston, Massachusetts, pp. 139-142.

Zhao et al., "Leveraging MLC STT-RAM for Energy-efficient CNN Training, " MEMSYS '18: Proceedings of the International Symposium on Memory Systems, Oct. 2018, Alexandria, Virginia, pp. 279-290.

Zhao et al., "PIE: A Pipeline Energy-efficient Accelerator for Inference Process in Deep Neural Networks," IEEE 22nd International Conference on Parallel and Distributed Systems (ICPADS), Dec. 13-16, 2016, Wuhan, China, 8 pages.

Zhang et al., "Frequency Domain Acceleration of Convolutional Neural Networks on CPU-FPGA Shared Memory System*," *FPGA (Field-Programmable Gate Arrays) '17 ACM/SIGDA International Symposium*, Monterey, CA, USA, Feb. 22-24, 2017, pp. 35-44.

* cited by examiner

ACCELERATION OF 1X1 CONVOLUTIONS IN CONVOLUTIONAL NEURAL NETWORKS

BACKGROUND

Technical Field

The present disclosure generally relates to convolutional accelerators, such as convolutional accelerators used in a learning/inference machine (e.g., an artificial neural network (ANN), such as a convolutional neural network (CNN)).

Description of the Related Art

Various computer vision, speech recognition, and signal processing applications may benefit from the use of learning/inference machines, which may quickly perform hundreds, thousands, or even millions of concurrent operations. Learning/inference machines, as discussed in this disclosure, may fall under the technological titles of machine learning, artificial intelligence, neural networks, probabilistic inference engines, accelerators, and the like. Conventional learning/inference machines can deliver hundreds of teraflops (e.g., one million millions ($10^{12}$) floating-point operations per second) of computing power.

Such learning/inference machines may include or otherwise utilize CNNs, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer. Hardware accelerators including convolutional accelerators are often employed to accelerate the processing of large amounts of data by a DCNN.

BRIEF SUMMARY

In an embodiment, a convolutional accelerator comprises a feature line buffer, a kernel buffer separate from the feature line buffer, a Multiply-ACcumulate (MAC) cluster, and mode control circuitry coupled to the feature line buffer, the kernel buffer and the MAC cluster. The mode control circuitry, in a first mode of operation of the convolutional accelerator, stores feature data in the feature line buffer, stores kernel data in the kernel buffer, transfers feature data from the feature line buffer to the MAC cluster, and transfers kernel data from the kernel buffer to the MAC cluster. In a second mode of operation of the convolutional accelerator, the mode control circuitry stores feature data in the kernel buffer, stores kernel data in the feature line buffer, transfers feature data from the kernel buffer to the MAC cluster, and transfers kernel data from the feature line buffer to the MAC cluster. The second mode of operation may be employed to efficiently process 1×N kernels, where N is an integer greater than or equal to 1.

In an embodiment, a system comprises a stream engine, which, in operation, streams feature and kernel data, and a convolutional accelerator coupled to the stream engine, wherein the convolutional accelerator, in operation, receives streams of feature and kernel data from the stream engine. The convolutional accelerator includes a feature line buffer, a kernel buffer, a multiply-accumulate cluster coupled to the feature line buffer and the kernel buffer, mode control circuitry coupled to the feature line buffer, the kernel buffer and the MAC cluster. The mode control circuitry, in a first mode of operation of the convolutional accelerator, stores feature data in the feature line buffer, stores kernel data in the kernel buffer, transfers feature data from the feature line buffer to the MAC cluster, and transfers kernel data from the kernel buffer to the MAC cluster. In a second mode of operation of the convolutional accelerator, the mode control circuitry stores feature data in the kernel buffer, stores kernel data in the feature line buffer, transfers feature data from the kernel buffer to the MAC cluster, and transfers kernel data from the feature line buffer to the MAC cluster. The second mode of operation may be employed to efficiently process 1×N kernels, where N is an integer greater than or equal to 1.

In an embodiment, a method comprises streaming feature data and kernel data to a convolutional accelerator, and convolving streamed kernel data with streamed feature data. The convolving includes, in a first mode of operation of the convolutional accelerator, storing feature data in a feature line buffer of the convolutional accelerator, storing kernel data in a kernel buffer of the convolutional accelerator, transferring feature data from the feature line buffer to a MAC cluster of the convolutional accelerator, and transferring kernel data from the kernel buffer to the MAC cluster. In a second mode of operation of the convolutional accelerator the convolving includes storing feature data in the kernel buffer, storing kernel data in the feature line buffer, transferring feature data from the kernel buffer to the MAC cluster, and transferring kernel data from the feature line buffer to the MAC cluster. The second mode of operation may be employed to efficiently process 1×N kernels, where N is an integer greater than or equal to 1.

In an embodiment, a non-transitory computer-readable medium's contents configure a convolutional accelerator having a plurality of modes of operation to convolve streamed kernel data with streamed feature data. The convolving includes, in a first mode of operation of the plurality of modes of operation of the convolutional accelerator, storing feature data in a feature line buffer of the convolutional accelerator, storing kernel data in a kernel buffer of the convolutional accelerator, transferring feature data from the feature line buffer to a MAC cluster of the convolutional accelerator, and transferring kernel data from the kernel buffer to the MAC cluster. In a second mode of operation of the plurality of modes of operation of the convolutional accelerator, the convolving includes storing feature data in the kernel buffer, storing kernel data in the feature line buffer, transferring feature data from the kernel buffer to the MAC cluster, and transferring kernel data from the feature line buffer to the MAC cluster. The second mode of operation may be employed to efficiently process 1×N kernels, where N is an integer greater than or equal to 1. In an embodiment, the contents comprise instructions executed by the convolutional accelerator.

BRIEF DESCRIPTION OF THE SEVERAL VIEWS OF THE DRAWINGS

One or more embodiments are described hereinafter with reference to the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, etc., in a hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figures 1, 2:
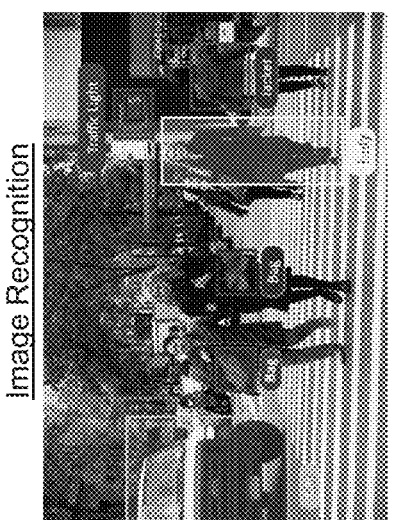
FIG. 1 is a conceptual diagram illustrating a digit recognition task.
FIG. 2 is a conceptual diagram illustrating an image recognition task.

CNNs are particularly suitable for recognition tasks, such as recognition of numbers or objects in images, and may provide highly accurate results. FIG. 1 is a conceptual diagram illustrating a digit recognition task and FIG. 2 is a conceptual diagram illustrating an image recognition task.

Figure 3:
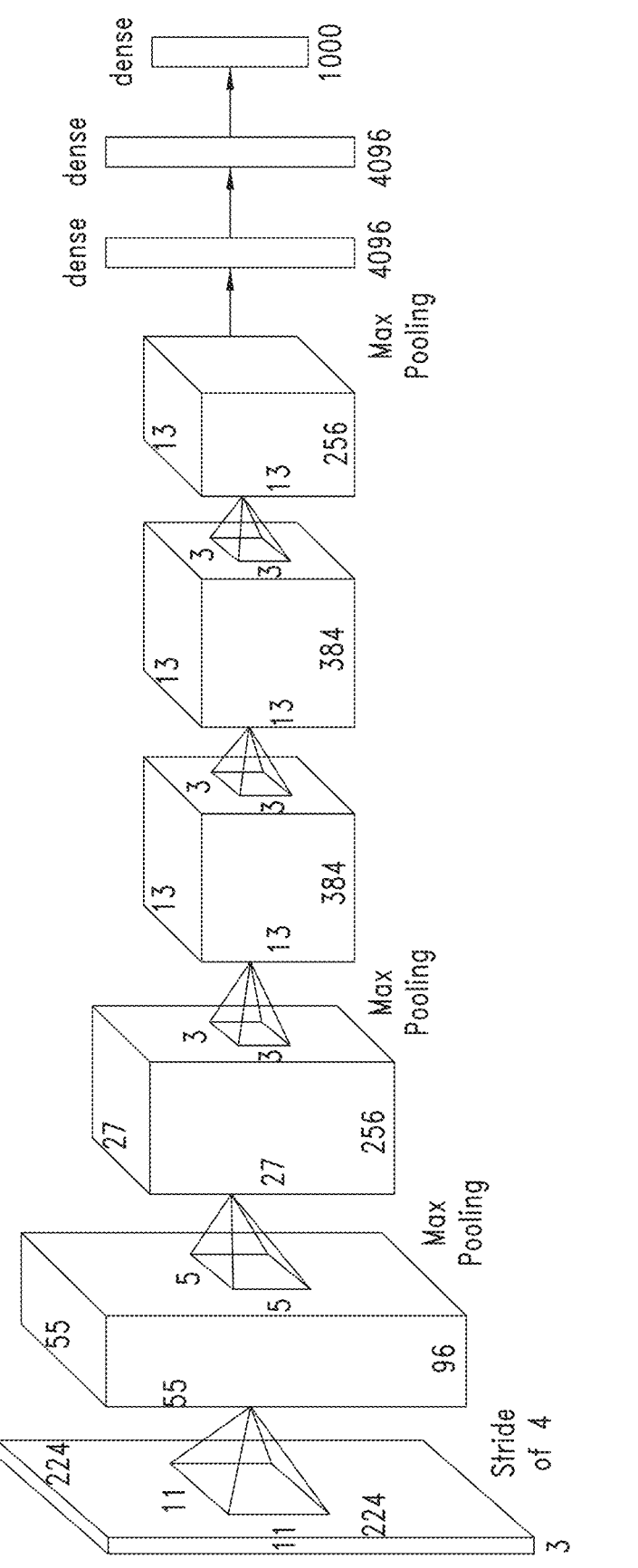
FIG. 3 is a conceptual diagram illustrating an example of a CNN.

CNNs are specific types of deep neural networks (DNN) with one or multiple layers which perform a convolution on a three dimensional feature data tensor (width×height×depth). The first layer is an input layer and the last layer is an output layer. The intermediate layers may be referred to as hidden layers. The most used layers are convolutional layers, fully connected or dense layers, and pooling layers (max pooling, average pooling, etc). Data exchanged between layers are called features or activations. Each layer also has a set of learnable parameters typically referred to as weights or kernels. FIG. 3 is a conceptual diagram illustrating an example of an CNN, that is AlexNet. The illustrated CNN has a set of convolutional layers interleaved with max pooling layers, followed by a set of fully connected or dense layers.

Figure 4:
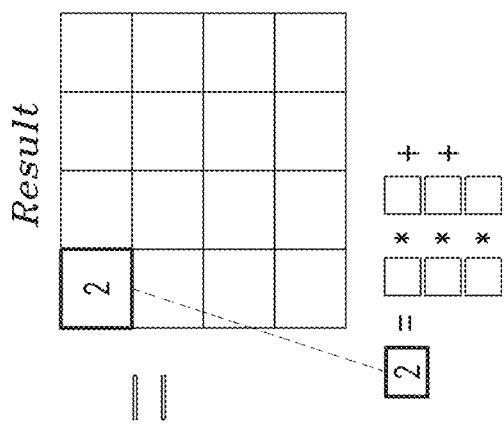
FIG. 4 is a conceptual diagram illustrating an example convolutional layer of a CNN.
Figure 4:
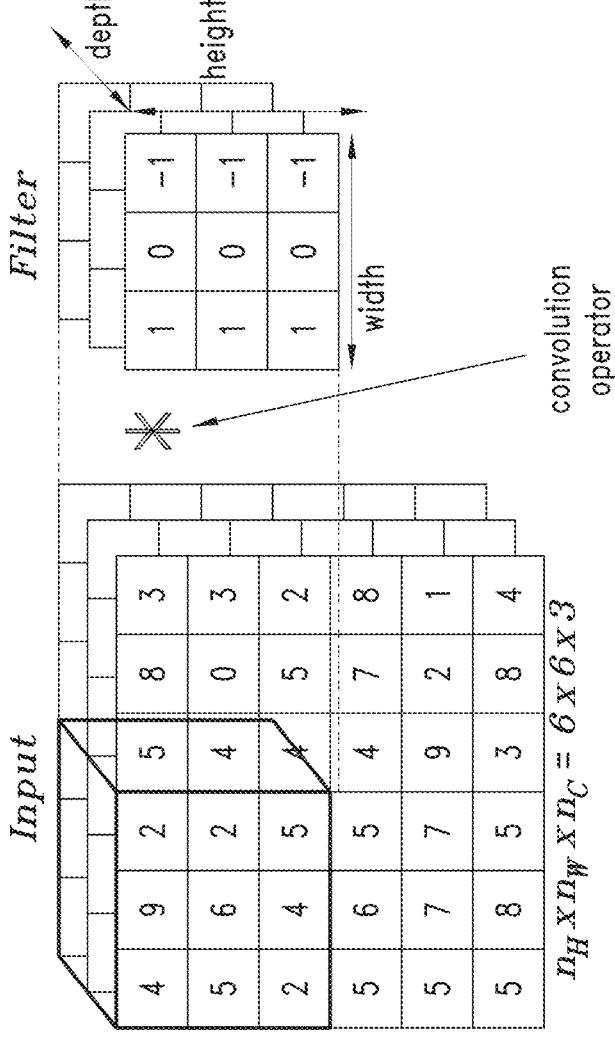

The parameters of a convolutional layer include a set of learnable filters referred to as kernels. Each kernel has three dimensions, height, width and depth. The height and width are typically limited in range (e.g., [1, 11]). The depth typically extends to the full depth of an input feature data. Each kernel slides across the width and the height of the input features and a dot product is computed. At the end of the process a result is obtained as a set of two-dimensional feature maps. In a convolutional layer, many kernels are applied to an input feature map, each of which produces a different feature map as a result. The depth of the output feature tensors is also referred to the number of output channels. FIG. 4 is a conceptual diagram illustrating the application of a kernel to a feature map, producing a two-dimensional feature map having a height of 4 and a width of 4.

Convolutional layers also may have other parameters, which may be defined for the convolutional layer, rather than learned parameters. Such parameters may be referred to as hyper-parameters. For example, a convolutional layer may have hyper-parameters including stride and padding hyper-parameters.

Figure 5:
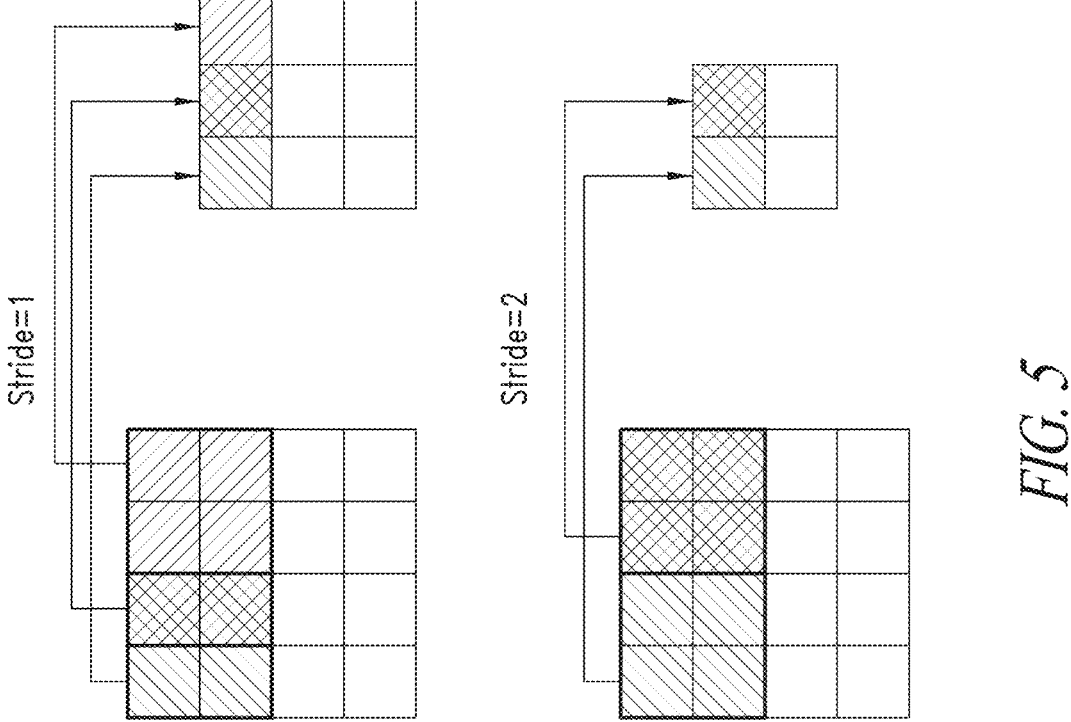
FIG. 5 is a conceptual diagram illustrating strides of convolutional layers of a CNN.

The stride hyper-parameter indicates a step-size used to slide kernels across an input feature map. FIG. 5 is a conceptual diagram comparing a stride of 1 and a stride of 2. When the stride is greater than 1, the output feature map will be smaller than the input feature map.

Figure 6:
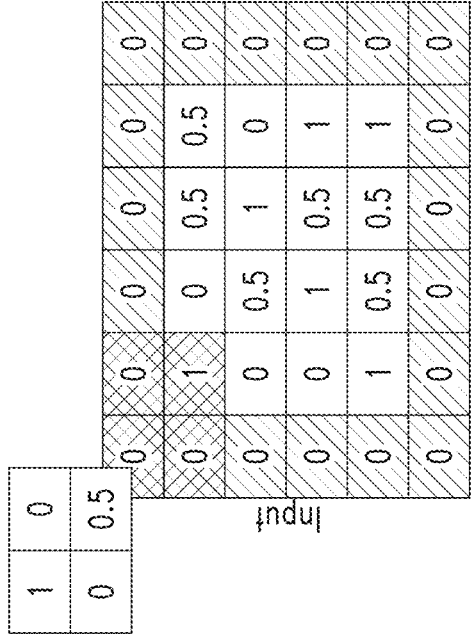
FIG. 6 is a conceptual diagram illustrating application of padding of an input feature map to preserve height and width dimensions during a convolutional.

The padding hyper-parameter indicate a number of zeros to be added along the height, the width or the height and width of the input feature map. The padding parameters may be used to control a size of an output feature map generated by the convolution. FIG. 6 is a conceptual diagram illustrating application of padding to an input feature map. The padding preserves the input feature size along the height and width of the feature map.

Figure 7:
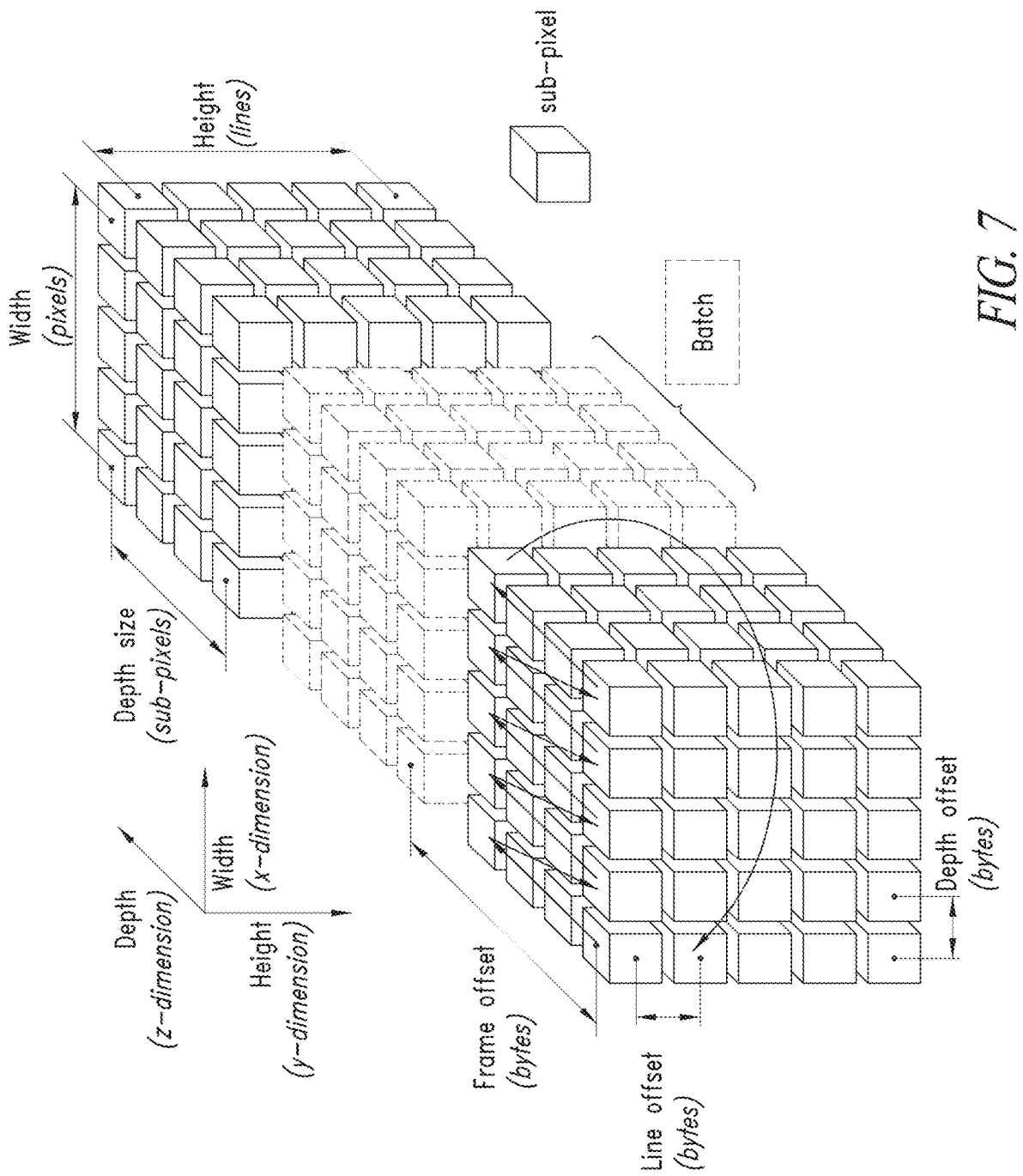
FIG. 7 is a conceptual diagram illustrating loading of feature data in batches.

The feature data of a convolutional layer may have hundreds or even thousands of channels, with the number of channels corresponding to the depth of the feature data and of the kernel data. For this reason, feature and kernel data are often loaded into memory in batches. FIG. 7 is a conceptual diagram illustrating the concept of loading feature data in batches. The feature data is split along the depth dimension into batches, with each batch of feature data having the same height, width and depth. The kernel depth is generally the same as the depth of the input feature map, so similar issues are addressed by batching.

Figure 8:
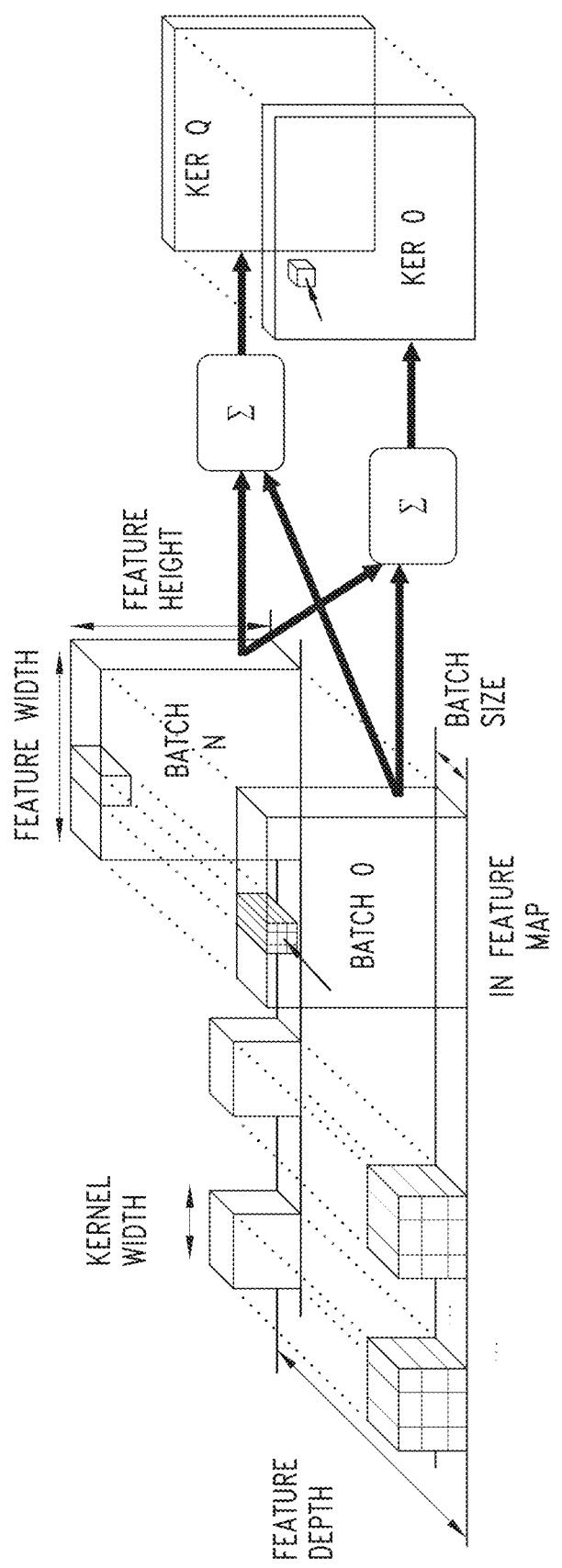
FIG. 8 is a conceptual diagram illustrating processing of a convolution in batches.

As illustrated, the batches have a height of 5, a width of 5, and a depth of 4. Batches are typically written into memory sequentially, with writing of a first batch being completed before beginning the writing of a second batch. The arrows in FIG. 7 illustrate an example order in which data of a batch is written into memory. A similar batching process is typically applied to the kernel data, with each batch of the kernel data having a same kernel height and kernel width, and the same depth as the batches of feature data. Each batch of feature data is convolved with a related batch of kernel data, and a feedback mechanism is employed to accumulate the results of the batches. The conceptual diagram of FIG. 8 illustrates the concept of batch processing of a convolution.

As can be seen, the computations performed by a CNN, or by other neural networks, often include repetitive computations over large amounts of data. For this reason, computing systems having hardware accelerators may be employed to increase the efficiency of performing operations associated with the CNN.

Figure 9:
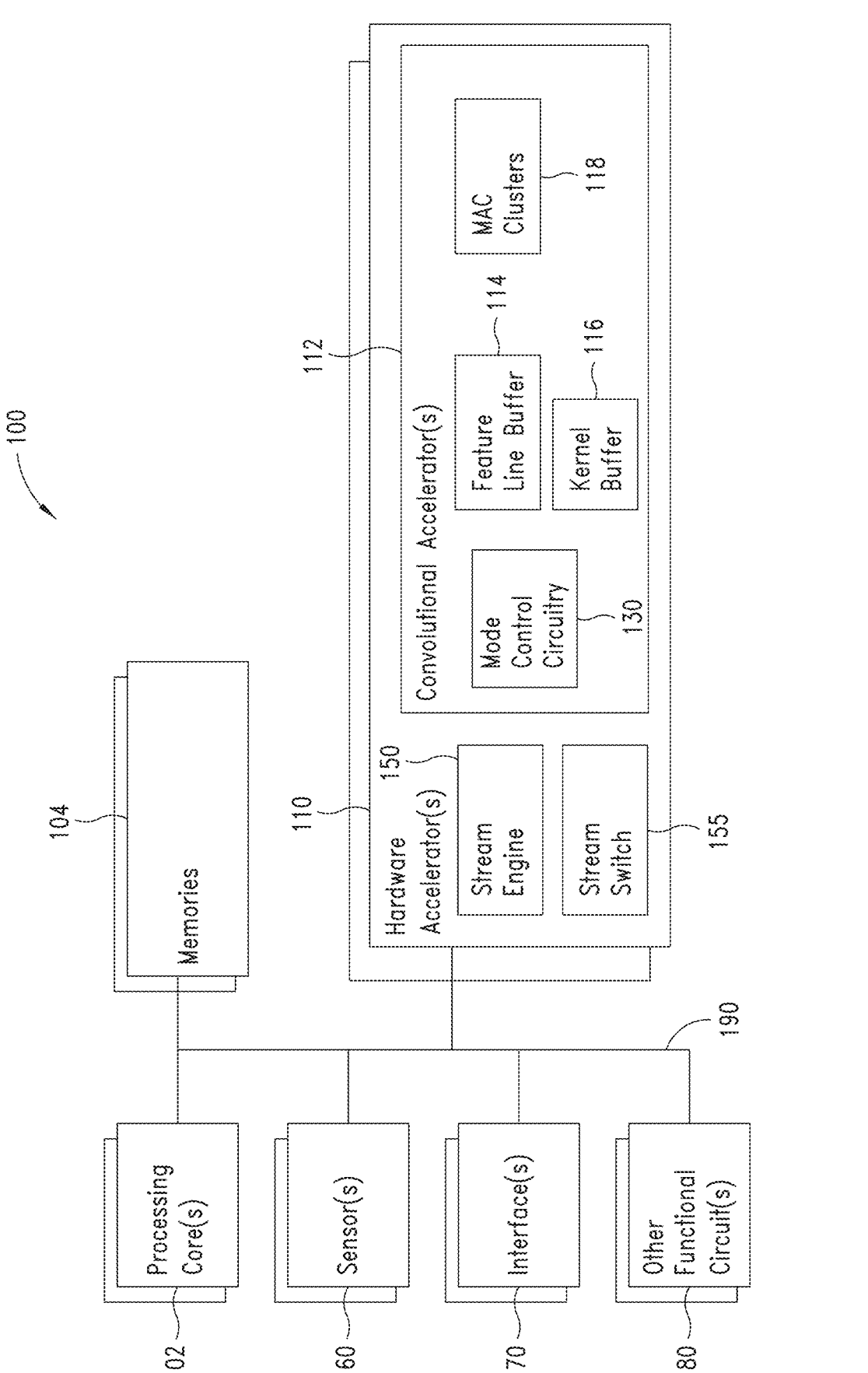
FIG. 9 is a functional block diagram of an embodiment of an electronic device or system employing convolutional accelerator mode control circuitry.

FIG. 9 is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify images using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, which, in operation, may be shared by one or more processes executed by the system 100.

The system 100 may include one or more sensors 160 (e.g., image sensors, audio sensors, accelerometers, pressure sensors, temperature sensors, etc.), one or more interfaces 170 (e.g., wireless communication interfaces, wired communication interfaces, etc.), and other circuits 180, which may include antennas, power supplies, one or more built-in self-test (BIST) circuits, etc., and a main bus system 190. The main bus system 190 may include one or more data, address, power and/or control buses coupled to the various components of the system 100.

The system 100 also includes one or more hardware accelerators 110 which, in operation, accelerate the performance of one or more operations associated with implementing a CNN. The hardware accelerator 110 as illustrated includes one or more convolutional accelerators 112 to facilitate efficient performance of convolutions associated with convolutional layers of a CNN. The convolutional accelerators include a feature line buffer memory 114, which, in operation, conventionally stores lines of feature data, a kernel buffer memory 116, which, in operation, conventionally stores kernel data, and one or more clusters of Multiply-ACcumulate (MAC) units or circuits 118, which in operation perform convolution operations using the buffered kernel and feature data. The hardware accelerator 110 as illustrated also includes a stream engine 150 and a stream switch 155. The stream engine 150, in operation, transmits data streams. For example, the stream engine 150 may stream data, such as feature data or kernel data stored in memory 104, to a convolutional accelerator 112 via the stream switch 155.

The kernel dimensions may vary between CNNs, and between convolutional layers of a single CNN. For example, in FIG. 3 convolutional layers with kernels having height and width dimensions of 11×11, 5×5 and 3×3 are illustrated. Historically, 3×3 kernels have been the most common. Thus, convolutional accelerators may typically be designed to efficiently support kernel computations within defined kernel height and width sizes, such as 3×3 kernels.

For example, the feature line buffer memory 114 may typically be a deep single port memory storing a few lines of feature data (e.g., three lines) and having a large number of storage elements per line (e.g., 1024 elements per line). Feature line data is often reused with multiple kernels, and a single port is generally sufficient for the feature line buffer memory 114 because the computations may typically be started once the feature line buffer is full.

The kernel buffer memory 116 may typically be a small, wide and shallow dual-port memory (e.g., 96 bits of width by 16 memory locations). Because the kernel buffer is wide, it is relatively expensive, and for this reason is often shallow to reduce the costs of the memory (e.g., to reduce the area costs). To provide for an efficient bandwidth in view of the shallow depth of the memory, the kernel buffer 116 may be a dual-port memory to facilitate simultaneous reading of stored kernel data for use in current convolutional operations and loading of kernel data into the kernel buffer for use in subsequent convolutional operations.

Figure 10:
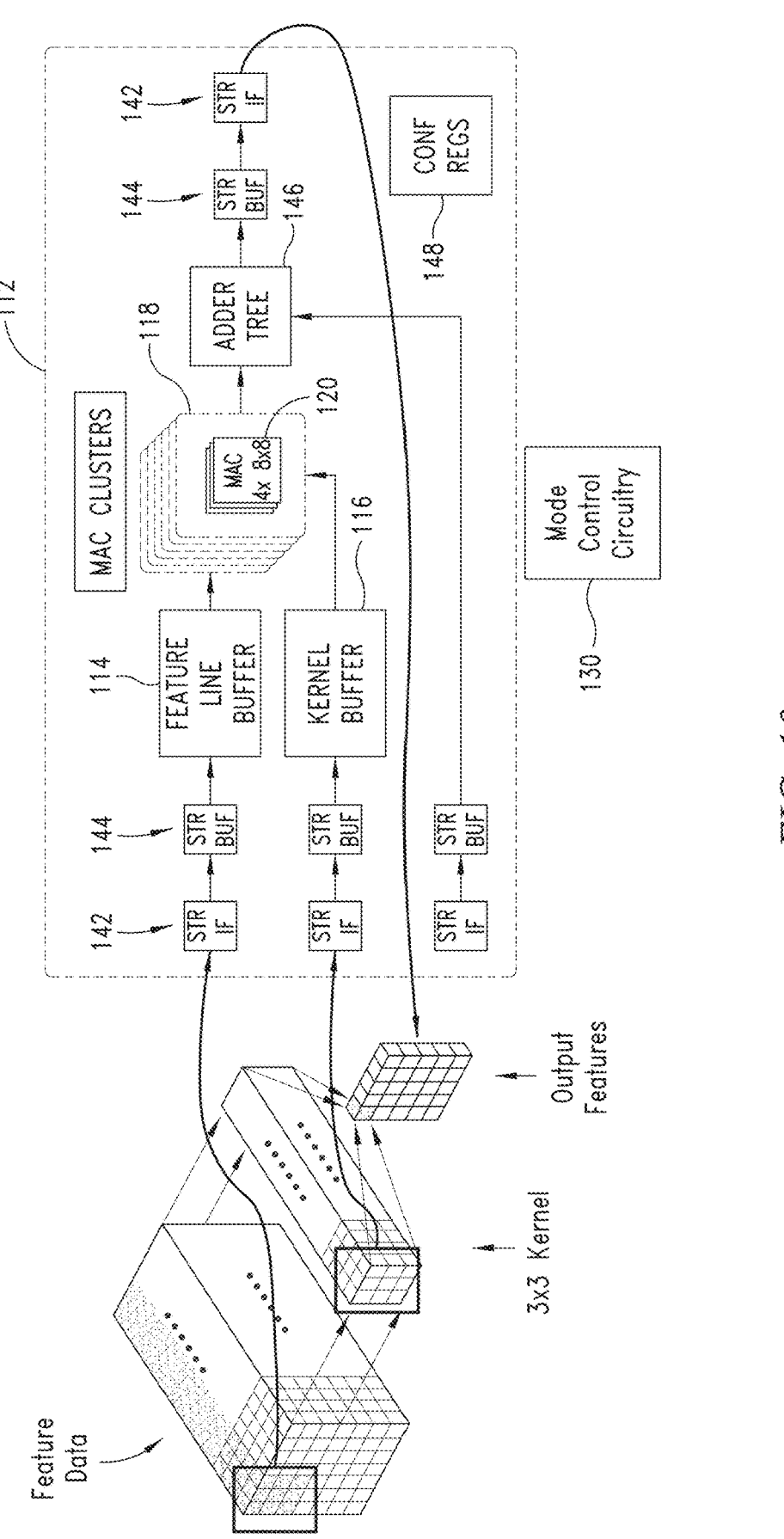
FIG. 10 is a conceptual diagram illustrating processing of convolutional operations having a 3×3 kernel using an embodiment of a convolutional accelerator.

FIG. 10 is a conceptual diagram illustrating processing of convolutional operations having a 3×3 kernel using an embodiment of a convolutional accelerator, such as the convolutional accelerator 112 of FIG. 9. Feature data is stored in the feature line buffer 114 (e.g., three lines of feature data which may be processed together), and kernel data is stored in the kernel buffer 116 (e.g., supporting kernels of various sizes up to a threshold size, with the storage in the buffer optimized, for example, for 3×3 kernel data). Convolutional operations are performed using the MAC clusters 118 (e.g., 72 MACs organized into 6 clusters 118 of 12 MACs each (three sets of four MAC units 120)) to operate on data received from the feature line buffer and the kernel buffer. FIG. 10 illustrates examples of other typical components of a convolutional accelerator (e.g., streaming interfaces 142, streaming buffers 144, an adder tree 146, configuration registers 148, etc.), which are not described in detail with reference to FIG. 10. Larger size kernels (e.g., 4×4, 11×11, etc.) may typically be handled using, for example, software kernel decomposition techniques.

Figure 11:
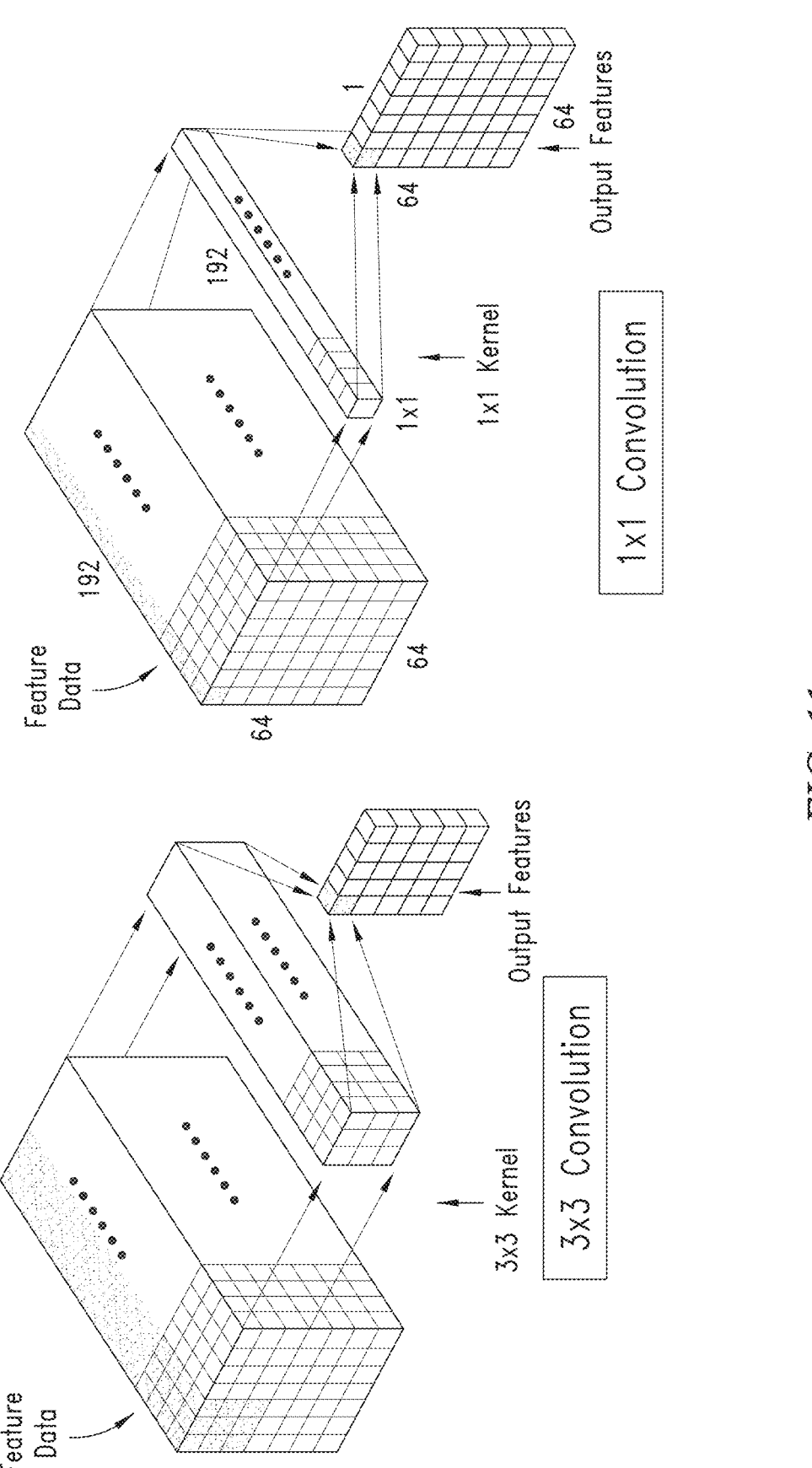
FIG. 11 is a conceptual diagram illustrating convolutional layers having 3×3 and 1×1 kernels respectively.

However, many CNNs have one or more layers with kernels having smaller height and width dimensions. For example, hidden or inner layers, especially dense or deep layers, may have a large number of channels of feature data and may frequently employ kernels having height and width dimensions smaller than 3×3, such as 1×1, 1×2, or 1×3, 1×N kernels. In particular, deep or dense convolutional layers having feature data with a larger number of channels convolved with deep 1×1 kernels are becoming increasingly popular in CNNs. FIG. 11 is a conceptual diagram illustrating convolutional layers having 3×3 and 1×1 kernels respectively.

Figure 12:
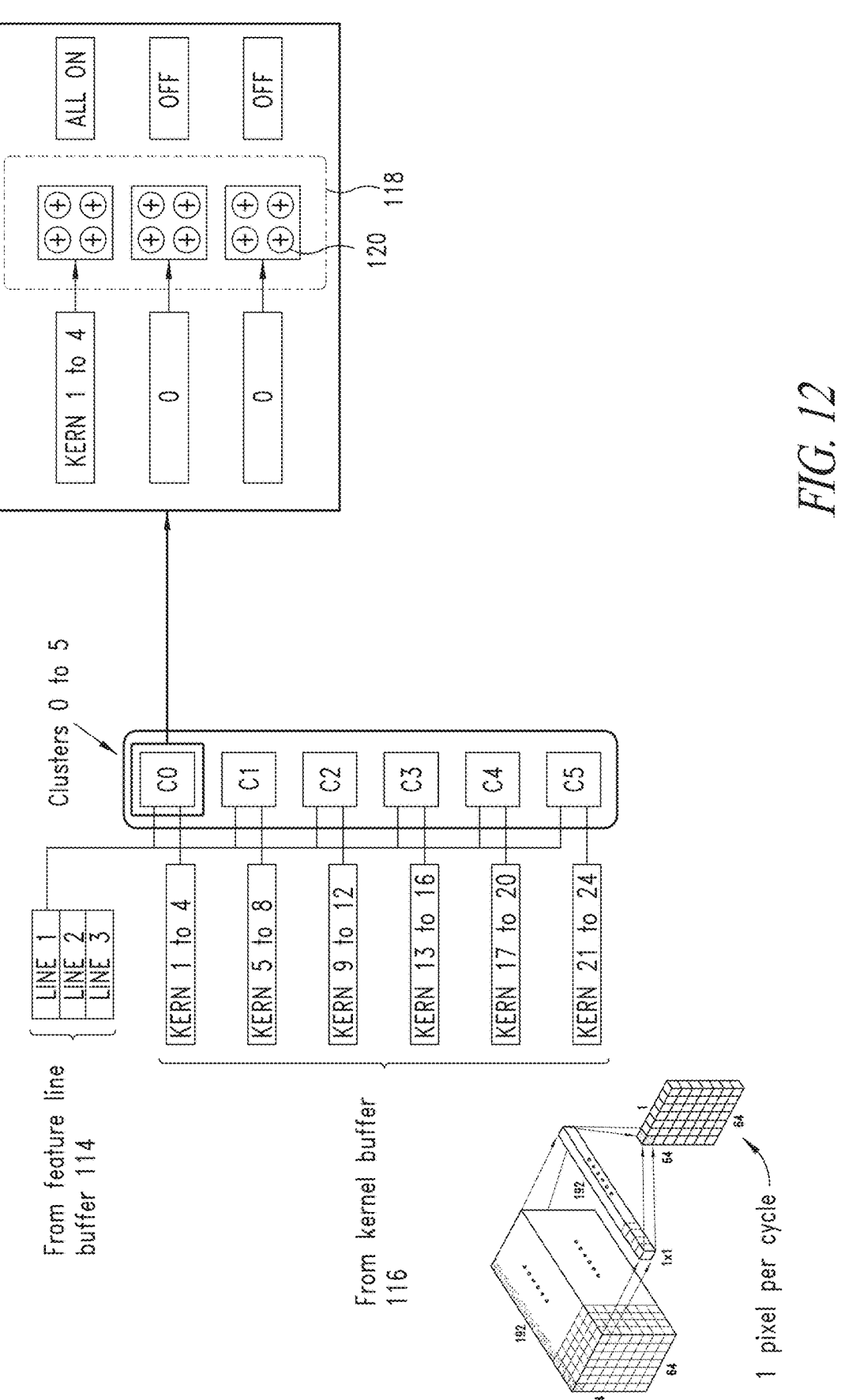
FIG. 12 is a conceptual diagram illustrating processing of convolutional operations having a 1×1 kernel using an embodiment of a convolutional accelerator storing feature line data in a feature line buffer and kernel data in a kernel buffer in a mode of operation in which components of the convolutional accelerator are switched off.

Kernels having smaller height and width dimensions (e.g., 1×1 kernels) may be processed by switching off some of the components of a convolutional accelerator. This can be inefficient in a number of ways, as discussed with reference to the conceptual diagram of FIG. 12, which illustrates an example of processing a convolutional layer with a 1×1 kernel by switching off components of a convolutional accelerator optimized for use with larger size kernels. Feature data is stored in the feature line buffer 114 and kernel data is stored in the kernel buffer 116.

To avoid congestion due to bandwidth saturation at the output, the number of input channels to the MAC units (which is limited by the depth of the kernel data that can be stored in the kernel buffer) is maintained to be greater than or equal to the number of output channels of the MAC units. Typical kernel buffer depth limitations may limit the number of input channels to the MAC clusters 118 to, for example, 24 channels for kernels having a height and width dimensions of 1×1. Thus, in the example considered the number of output channels of the MAC clusters would be limited to 24 channels, due to the bottleneck created by the size of kernel buffer memory, to avoid bandwidth saturation at the output.

In an example configuration of 72 MAC units organized into 6 clusters C0-C5 of 12 MACs 120 each discussed above, only four MAC units 120 of the twelve MAC units of each cluster may be active, with the rest of the MAC units remaining idle, and only one output pixel per kernel may be processed per cycle. As illustrated, kernels 1-4 are provided to the first cluster of 12 MAC units with only 4 of the 12 MAC units being used, kernels 5-8 are provided to the second cluster of 12 MAC units with only 4 of the 12 MAC units of the second cluster being used, etc.

In addition, the ratio between fetched kernel data and the number of operations performed using the fetched kernel data drops dramatically as compared to processing of a 3×3 kernel, etc. using the same or a similar convolutional accelerator configuration. Thus, a significant number of additional fetch operations must be performed to process the convolutions of a convolutional layer having a 1×1 kernel when a solution of switching off components of the convolutional accelerator is employed.

Another alternative is to use fine-grained accelerator hardware. This approach, however, involves a substantial overhead in terms of control circuitry and software processing to process larger kernels using the fine-grained hardware. Using fine-grained hardware is not as efficient in processing larger kernels as coarse-grained accelerators. Such larger kernels, such as 3×3 kernels, also are frequently employed in CNNs as noted above.

The inventors have realized that hardware resources of a coarse-grained convolutional accelerator (e.g., a convolutional accelerator designed to efficiently process kernels having height and width dimensions of 3×3) may be reused or reconfigured to more efficiently perform convolutions using kernels having smaller height and width dimensions (e.g., 1×1, 1×2, 1×N dimensions) by employing two different modes of operation instead of switching off components.

When a convolutional layer having a 1×1 kernel is being processed, only one line of feature data needs to be stored at a time for convolving with kernels of the 1×1 kernels, so a deep three-line feature line buffer is not needed for the feature data. In addition, the size characteristics of the relatively deep feature line buffer 114 are more suited to storing kernel data associated with a deep 1×1 kernel than the size characteristics of the shallower kernel buffer 116.

The inventors realized the types of data stored in the two buffers may be switched when convolutional layers having kernels with smaller height and width dimensions are being processed. A first mode of operation may be employed to process kernels having larger height and width dimensions (e.g., 3×3 kernels), and a second mode of operation may be employed to process kernels having smaller height and width dimensions (e.g., 1×1, 1×2, 1×N). Two example modes of operation are conceptually illustrated by the conceptual diagram of FIG. 13.

Figure 13A:
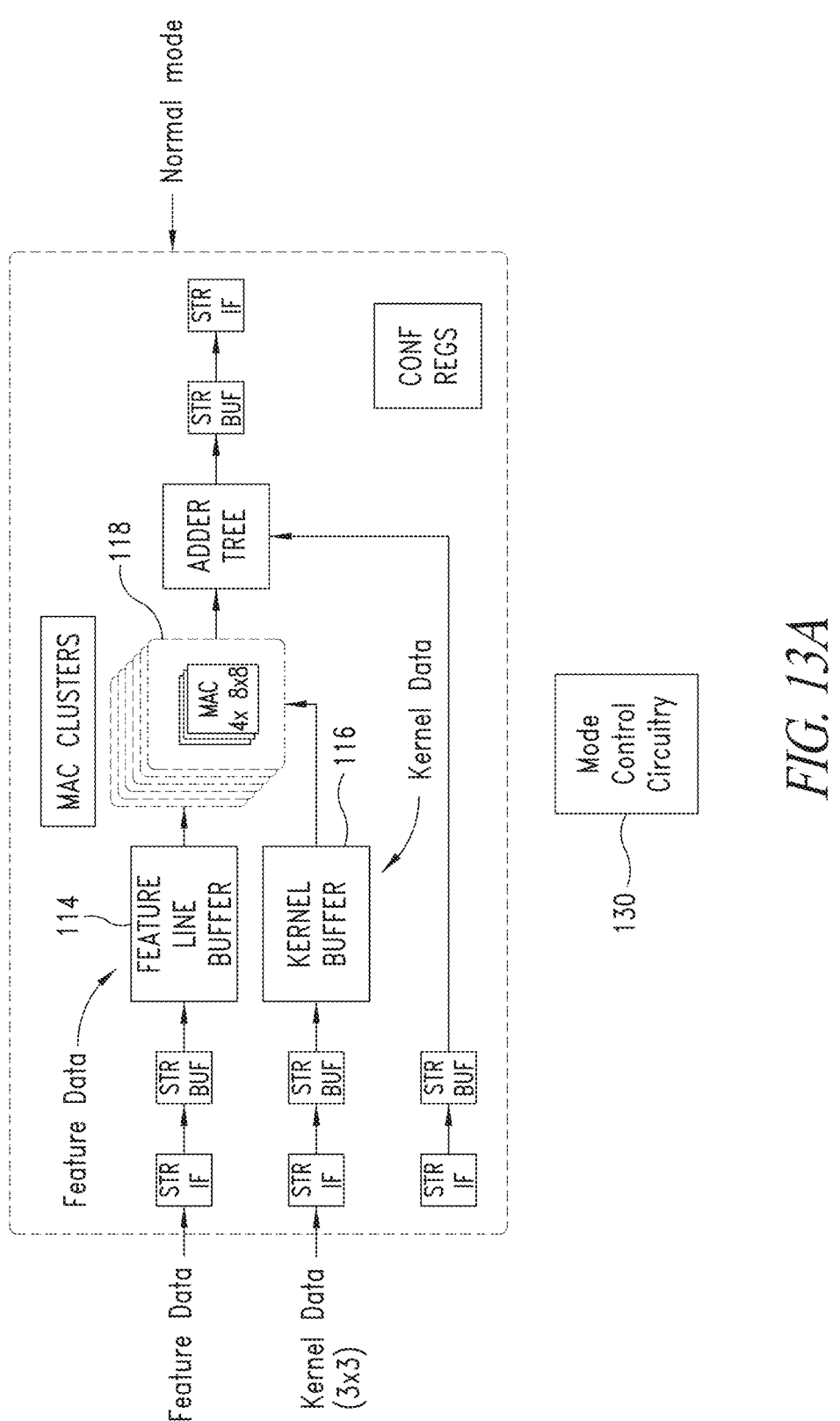
FIGS. 13A and 13B (collectively referred to herein as FIG. 13) are conceptual diagrams illustrating two modes of operation of a convolutional accelerator according to an embodiment.
Figure 13B:
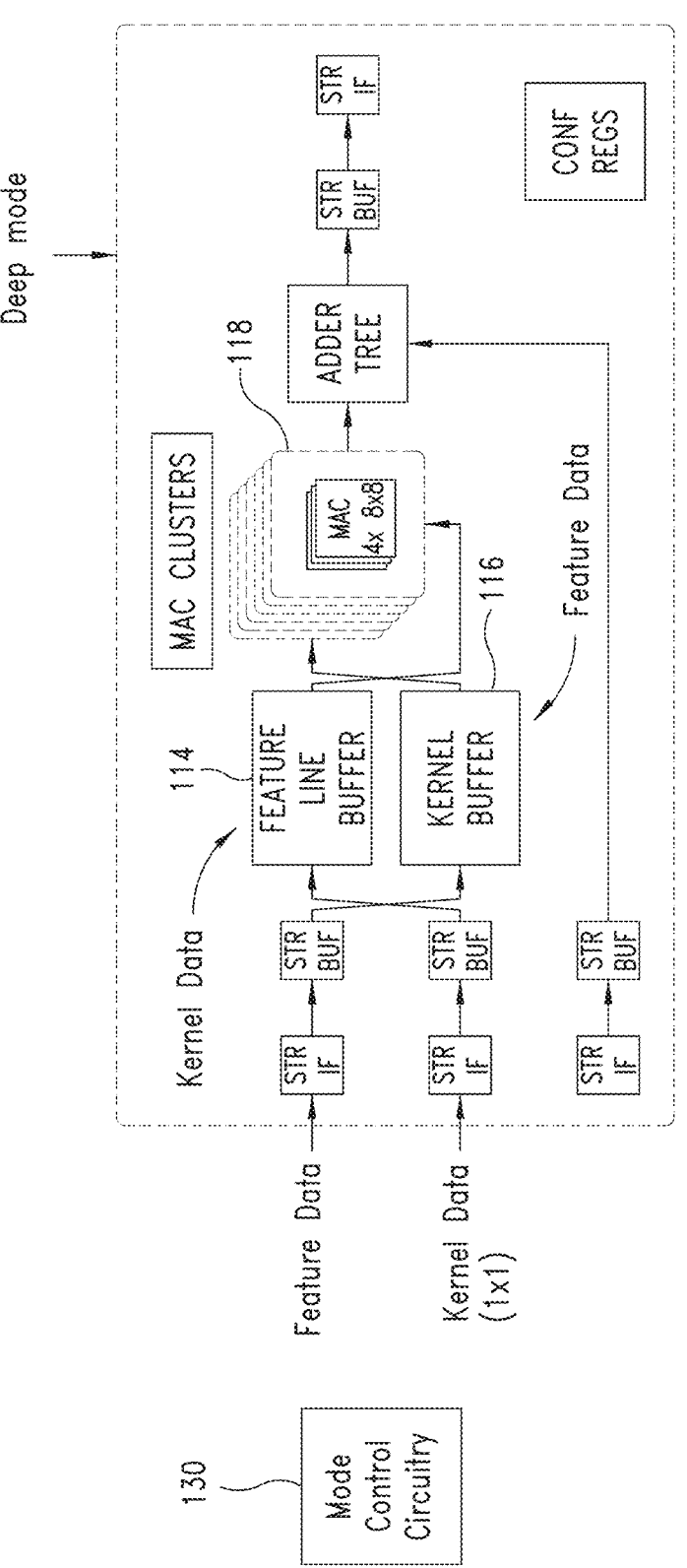

In a first mode of operation, labeled normal mode in FIG. 13, feature data is stored in the feature line buffer 114 and kernel data is stored in the kernel buffer 116. The first mode of operation may be employed, for example, to process typical 3×3 kernels in a generally conventional manner. See the discussion of FIG. 10, above.

In a second mode of operation, labeled deep mode in FIG. 13, feature data is stored in the kernel buffer 116 instead of in the feature line buffer, and kernel data is stored in the feature line buffer 114. For example, in the second mode of operation, two sets of 24 1×1×128 different kernels may be stored in the feature line buffer 114, and 3 lines of feature data having a depth of 128 pixels may be stored in the kernel data buffer 116. The second mode of operation may be employed, for example, to process 1×1 kernels, such as 1×1 kernels having a depth for which using the second mode of operation instead of the first mode of operation may provide increased efficiencies (e.g., a depth larger than a number of MAC units of the MAC cluster, in the example discussed, a kernel depth of 128, which is larger than 72).

To facilitate the first and second modes of operation, the system 100 as illustrated in FIG. 9 comprises mode control circuitry 130. In the first mode of operation, the mode control circuitry 130 controls the storage of feature data in the feature line buffer 114 and the transfer of feature data from the feature line buffer 114 to the MAC clusters 118, and the storage of kernel data in the kernel buffer 116, and the transfer of kernel data from the kernel buffer 116 to the MAC clusters 118. Operation of the mode control circuitry in the first mode of operation may be performed to control the storage and transfer of feature and kernel data in a generally conventional manner. For example, as illustrated in the conceptual diagram of FIG. 10. While the mode control circuitry 130 is illustrated as a block in FIGS. 9 and 13, the mode control circuitry may be implemented, for example, using control logic and discrete components (e.g., multiplexers, existing buffers, etc.) distributed through the convolutional accelerator 112.

In the second mode of operation, the mode control circuitry 130 controls the storage of kernel data in the feature line buffer 114 and transmission of kernel data from the feature line buffer 114 to the MAC clusters 118, and the storage of feature data in the kernel buffer 116, and the transfer of feature data from the kernel buffer 116 to the MAC clusters 118. Examples of the operation and configurations of embodiments of the mode control circuitry 130 in the second mode of operation are discussed herein with reference to FIGS. 14-23.

Embodiments of the system 100 of FIG. 9 may include more components than illustrated, may include fewer components than illustrated, may combine components, may separate components into sub-components, and various combination thereof. For example, the hardware accelerator 110 may include DMA controllers, the mode control circuitry 130 may be split into input mode control circuitry to control the storage of input feature data and kernel data into the buffers 114, 116, and output mode control circuitry to control the transfer of stored input feature data from the buffers 114, 116 to the MAC clusters 118, all or part of the mode control circuitry 130 may be shared by one or more convolutional accelerators 112, the mode control circuitry 130 may be integrated into other control circuitry of the convolutional accelerator, etc., and various combinations thereof.

Figure 14:
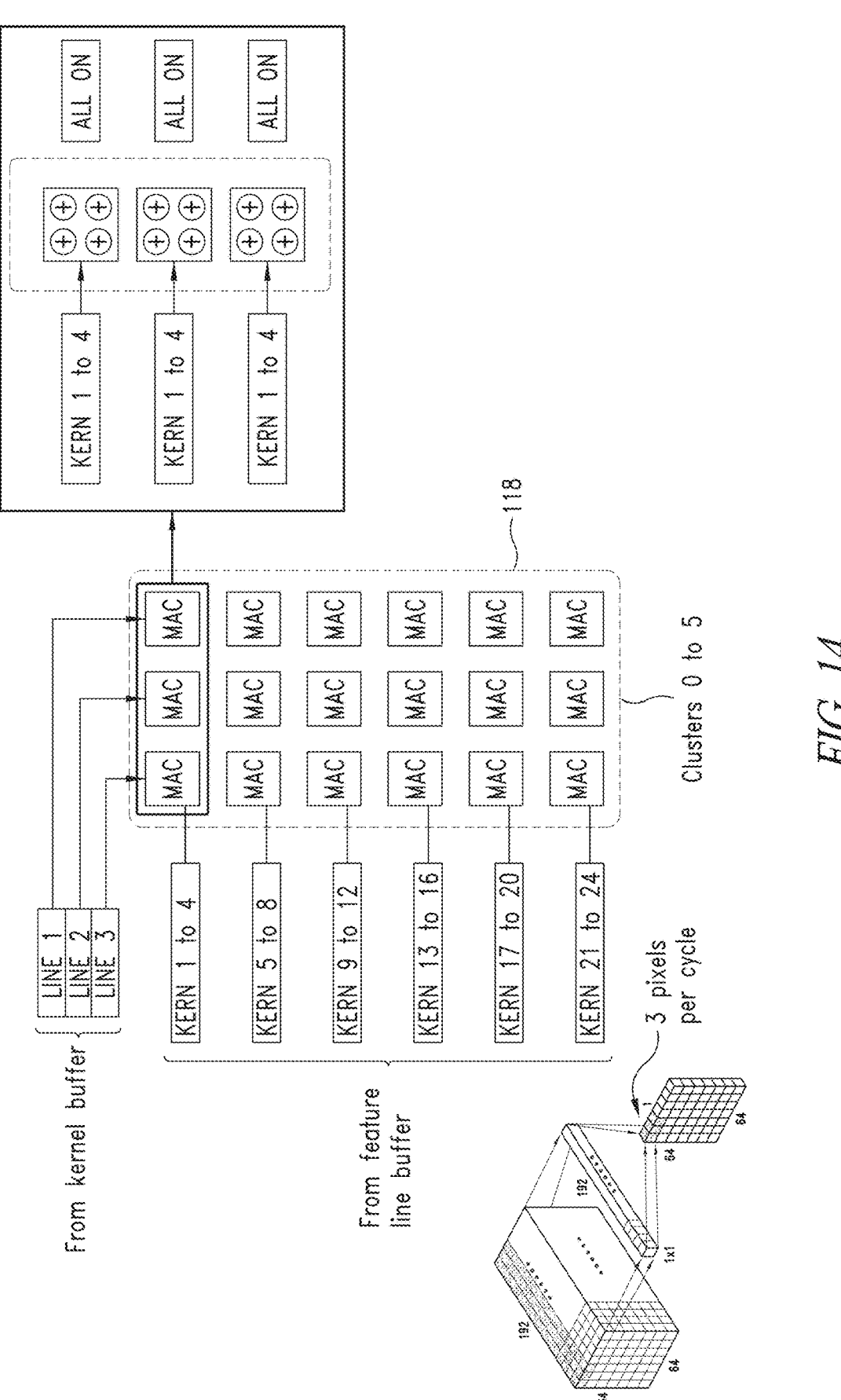
FIG. 14 is a conceptual diagram illustrating processing of convolutional operations having a 1×1 kernel using an embodiment of a convolutional accelerator storing feature line data in a kernel buffer and kernel data in a feature line buffer in a deep mode of operation of the convolutional accelerator.

FIG. 14 is a conceptual diagram illustrating an example of processing a convolutional layer with a 1×1 kernel by operating the convolutional accelerator in a second mode of operation in which kernel data is stored in a feature line buffer (e.g., feature line buffer 114 of FIG. 9) and pixels of feature data are stored in a kernel buffer (e.g., kernel buffer 116 of FIG. 9).

A large single-port feature line buffer 114, which may normally be used to store 3 lines of feature data having a depth of 1024 elements, is instead controlled to store 24 kernels having a depth of up to 128 kernel values. Thus, 128 input channels are available, which is greater than the number of output channels of 72 available in the example configuration discussed above with reference to FIG. 9. In the second mode of operation, the kernel buffer 116 is controlled to store three lines of feature data, and thus three lines of feature data may be fed to clusters of MAC units 118.

As shown in FIG. 14, kernels 1-4 are provided to a set of three clusters of four MAC units each. One of the three clusters of four MAC units computes the output for line 1 of the feature data and kernels 1-4, a second one of the three clusters of 4 MAC units computes the output for line 2 of the feature data and kernels 1-4, and a third one of the three clusters computes the output for line 3 of the feature data and kernels 1-4. Similarly, kernels 5-8 are provided to another set of three clusters of four MAC units each, each cluster computing the output for a respective line of the feature data and kernels 5-8. Kernels 9-12, 13-16, 17-20 and 21-24 are similarly provided to respective clusters of four MAC units each to compute outputs for respective lines of the feature data and the respective kernels.

The throughput is improved from 1 pixel depth per kernel in a cycle to 3 pixel depths per kernel in a cycle when a convolutional layer having a 1×1 kernel is processed using the deep mode of operation as compared to the normal mode of operation. In addition, each kernel value is used in three MAC operations in a cycle, significantly improving the ratio of the number of fetch operations to the number of MAC operations performed as compared to the use of each kernel value in one MAC operation per cycle when the normal mode of operation is employed to process a 1×1 kernel (see FIG. 12).

Figure 15:
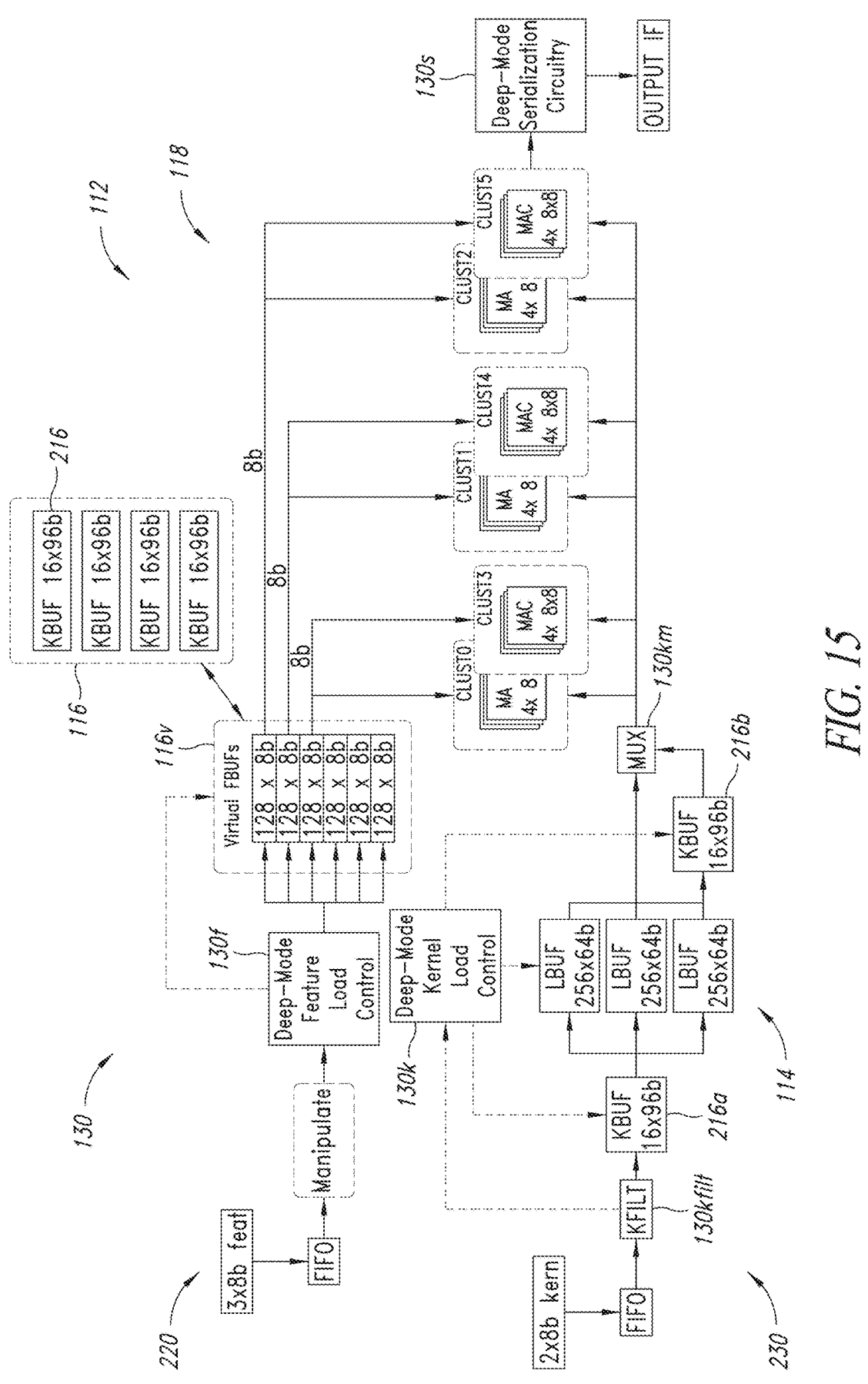
FIG. 15 is a functional block diagram of an embodiment of a convolutional accelerator including mode control circuitry controlling operation of the convolutional accelerator in a deep mode of operation.

FIG. 15 is a conceptual diagram illustrating an embodiment of a configuration of a feature data path 220 and a kernel data path 230 of a convolutional accelerator 112 operating in a mode of operation, such as a deep mode of operation, in which feature line data is stored in a kernel buffer 116, and kernel data is stored in a feature line buffer 114. An embodiment of the feature data path 220 is shown in more detail in FIG. 18, and an embodiment of the kernel data path 230 is shown in more detail in FIG. 19.

The kernel buffer 116 in the embodiment of FIG. 15 comprises six dual-port memories 216, as illustrated six 16×96 bit dual-port buffers. In the normal mode of operation, the six dual port memories 216 of the kernel buffer 116 store kernel data, which may be done in a generally conventional manner. In the deep mode of operation, four of the six dual-port memories 216 are included in the feature data path 220 and controlled by feature load control circuitry 130f of the mode control circuitry 130 to store feature line data.

As illustrated the four dual-port memories are organized into six virtual buffers 116v of 128×8 bits in the feature line path 220, each virtual buffer 116v storing a line of feature data. Three lines of feature data may be fed to the MAC clusters 118 at a time, each line being provided by the respective virtual buffer to two of the six clusters of MAC units 118. While feature data from three of the virtual buffers 116v is being fed to the MAC clusters 118, feature data for a next set of computations may be loaded into the other three virtual buffers 116v. Thus, three lines of feature data may be stored into the virtual buffers 116v of the kernel buffer memory 116 at a time in a ping-pong fashion. The feature data load control circuitry 130f of the mode control circuitry 130 is included in the feature data path 220, and in operation the feature data load control circuitry 130f controls the order in which pixels of feature data are stored into the virtual buffers 116v of the kernel buffer 116. As illustrated, the feature line path 220 includes a FIFO buffer and optional data manipulation circuitry.

In the second or deep mode of operation, the feature line buffer 114 is included in the kernel data path 230 and controlled to store kernel data by kernel load control circuitry 130k of the mode control circuitry 130. The two remaining dual-port buffers 216 of the kernel buffer 116 may advantageously be used in the kernel data path 230 to facilitate the storage in and retrieval from the feature line buffer 114 of kernel data stored therein. As illustrated, one of the dual-port buffers 216a may be used to reduce the number of cycles needed to fill the feature line buffer 114 with kernel data, and one of the dual-port buffers 216b may be used to mirror the output of the feature line buffer 114 in order to emulate dual-port memory performance by the single port feature line buffer 114 (e.g., to facilitate use of kernel data stored in the dual-port buffer 216b by the MAC clusters 118 while subsequent kernel data is being loaded into the feature line buffer 114 from the dual-port buffer 216a).

As illustrated, the kernel load control circuitry 130k includes filtering circuitry 130kfilt, which in operation selects kernels from kernel data path 230 to load into the feature line buffer 114 via the dual-port buffer 216a, and multiplexer circuitry 130km, which in operation, controls the transmission of kernel data from the dual port buffer 216b to the MAC clusters 118. The mode control circuitry 130 of FIG. 15 as illustrated also includes serialization circuitry 130s, which in operation serializes the outputs of the MAC clusters to account for the order in which the MAC operations are performed.

Figure 16:
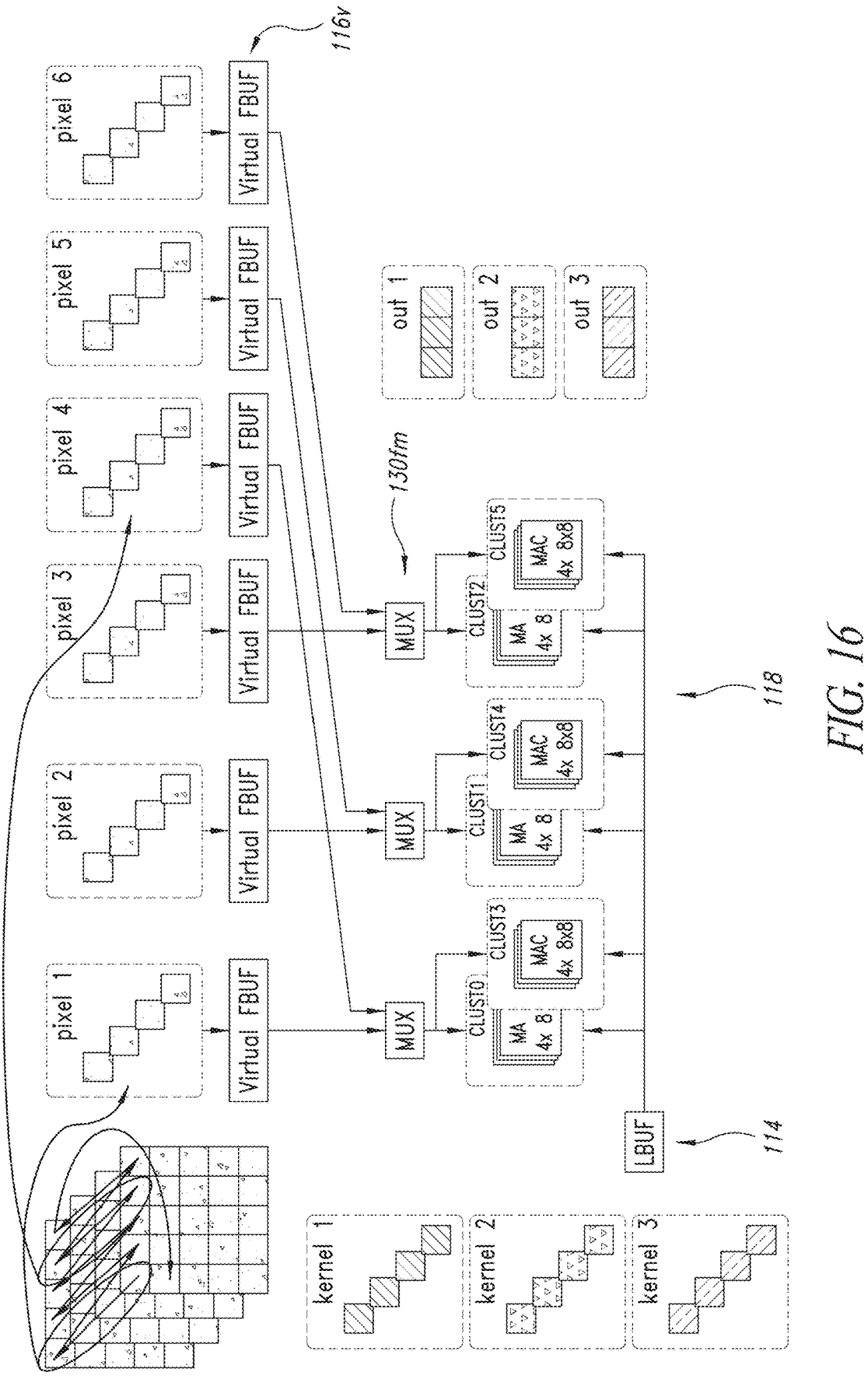
FIG. 16 is a conceptual diagram illustrating feature and kernel data flow paths in a deep mode of operation of a convolutional accelerator according to an embodiment.

FIG. 16 is a conceptual diagram illustrating feature and kernel data flow paths in a deep mode of operation of a convolutional accelerator according to an embodiment. Features are streamed depth-wise and a whole pixel is stored in each virtual buffer 116v of the kernel buffer 116. Three pixels at a time are sent to the MAC clusters 118, with each pixel being provided to a pair of the six MAC clusters 118. For example, multiplexers 130fm of the mode control circuitry 130 may be controlled to provide either pixels 1-3 or pixels 4-6 to respective pairs of MAC clusters of the MAC clusters 118.

Figure 17:
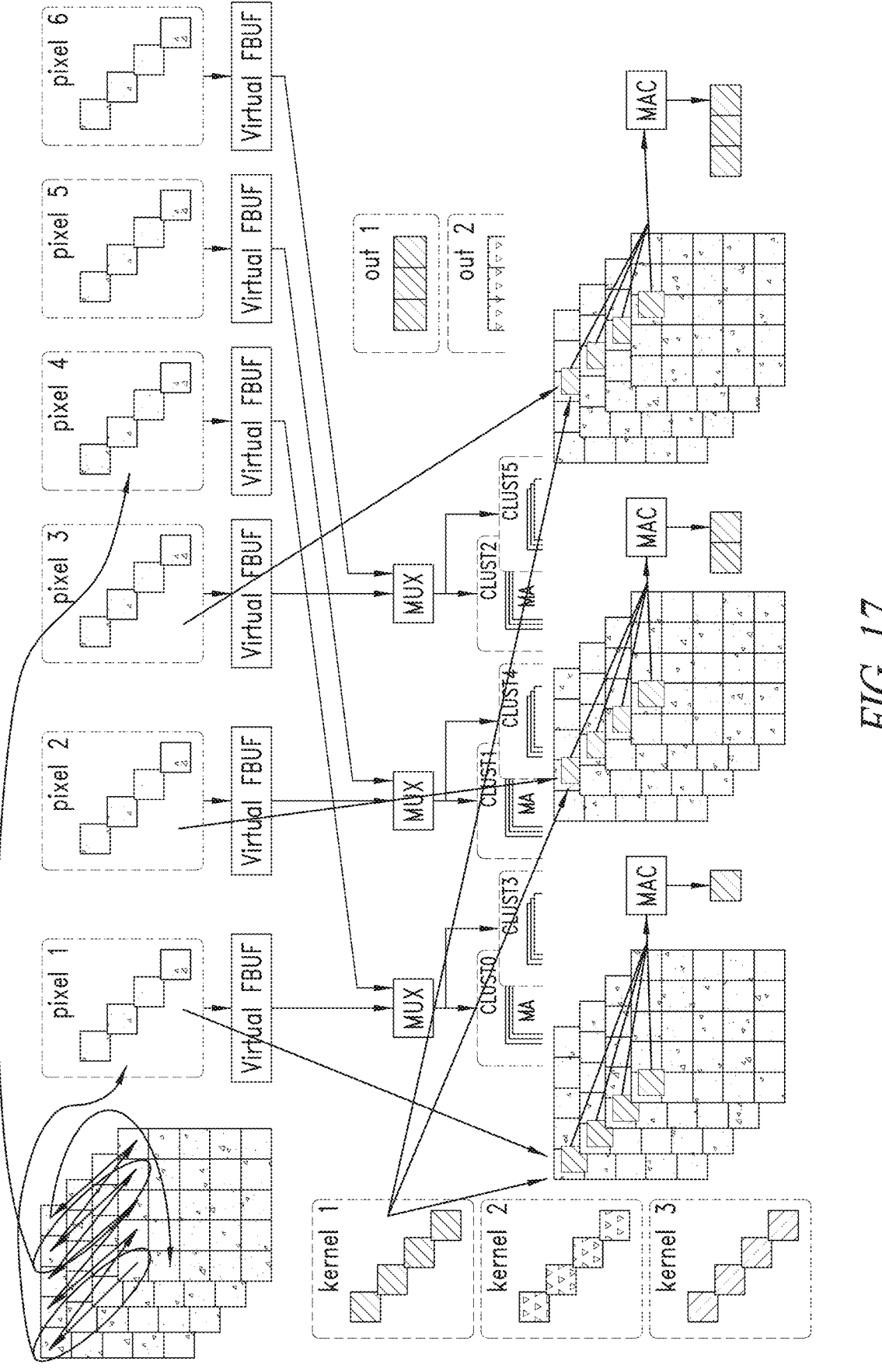
FIG. 17 is a conceptual diagram illustrating the performance of three convolutional operations per kernel value of a 1×1 kernel in an operational cycle of a convolutional accelerator operating in a deep mode of operation according to an embodiment.

Kernels 1-24 are stored in the feature line buffer 114, and all 24 kernels are sent to respective MAC clusters in a cycle (see FIG. 14), generating three lines of an output feature map. FIG. 17 is a conceptual diagram illustrating the transmission of three pixels per cycle for a given kernel value in the example configuration of FIG. 16. The same kernel is strided three times in a cycle, obtaining three output values for each kernel value, or 72 output values for 24 kernels in a cycle.

Figure 18:
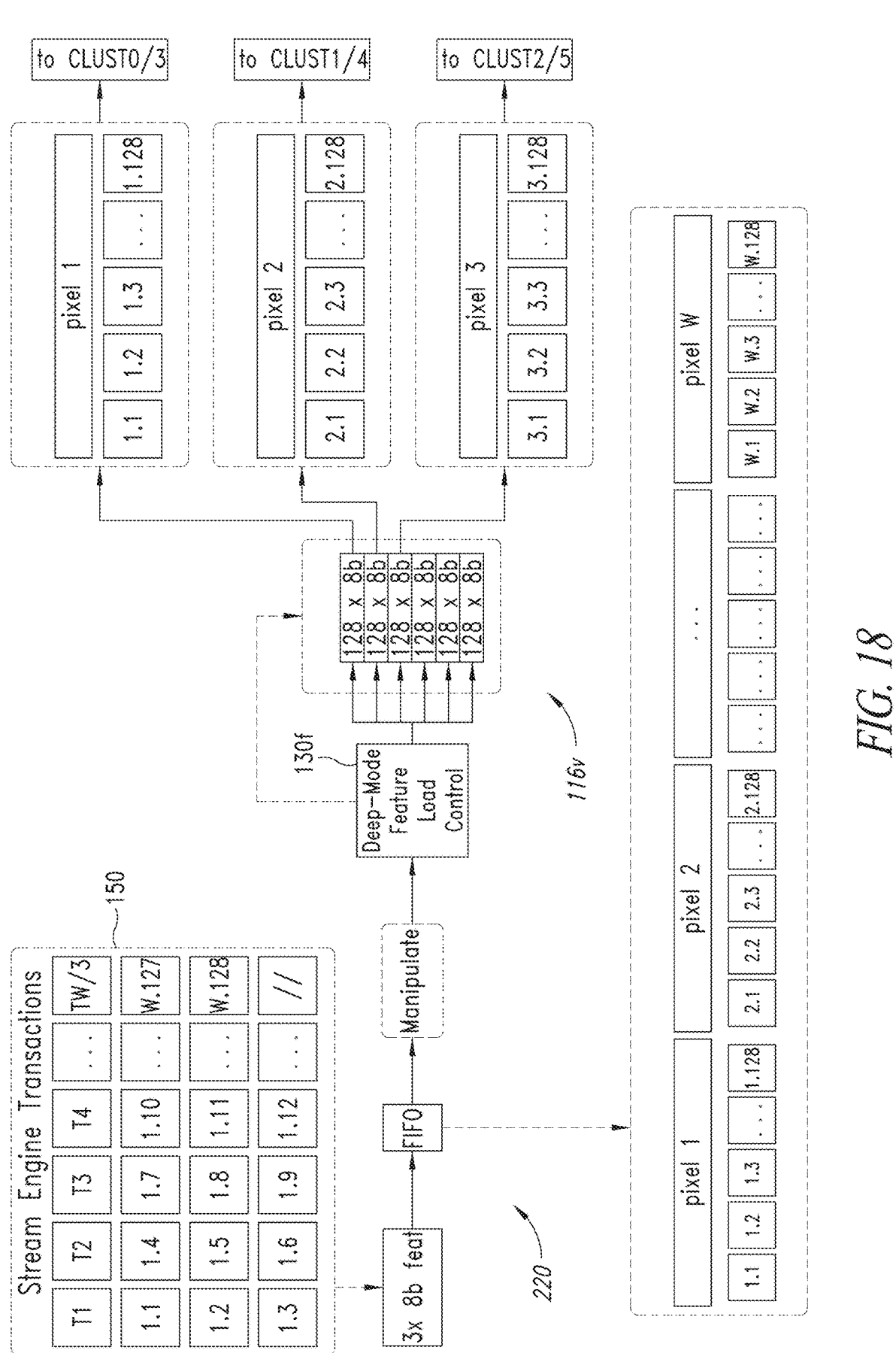
FIG. 18 is a conceptual diagram illustrating a data path of the feature data in a convolutional accelerator operating in a deep mode of operation according to an embodiment.

FIG. 18 is a conceptual diagram illustrating a data path 220 of the feature data in a convolutional accelerator operating in a deep mode of operation according to an embodiment. Streaming engine 150 may be capable of streaming, for example, 3 bytes of data or more in a transaction. As illustrated, the streaming engine streams pixel 1, depth 1 of feature data (1.1 in FIG. 18), pixel 1, depth 2 (1.2 in FIG. 18) and pixel 1, depth 3 (1.3 in FIG. 18) in a first transaction, T1. Transaction T2 sends the next three depths of pixel 1, shown as 1.4, 1.5 and 1.6 in FIG. 18. The transmission continues in successive transmissions until the transmission of a set of pixels is complete, as illustrated until pixel W, depth 128 is transmitted. Other pixel depths may be employed. The pixels are stored in a FIFO buffer, and may be manipulated using data manipulation circuitry, before being stored in respective virtual buffers 116v by the feature load control circuitry 130f. As illustrated, three pixels at a time are provided by respective virtual buffers 116v to respective pairs of clusters of four MAC units. The availability of three pixel values (e.g., pixel 1, depth 1, pixel 2, depth 1, and pixel 3, depth 1) for processing with each kernel value available (e.g., kernels 1-24) in a cycle provides a three-to-one improvement in the throughput and improves the ratio of MAC calculations per retrieved kernel value. As mentioned above, while feature data from three of the virtual buffers 116v is being fed to the MAC clusters 118, feature data for a next set of computations may be loaded into the other three virtual buffers 116v. Thus, three lines of feature data may be stored into the virtual buffers 116v of the kernel buffer memory 116 at a time in a ping-pong fashion.

Figure 19:
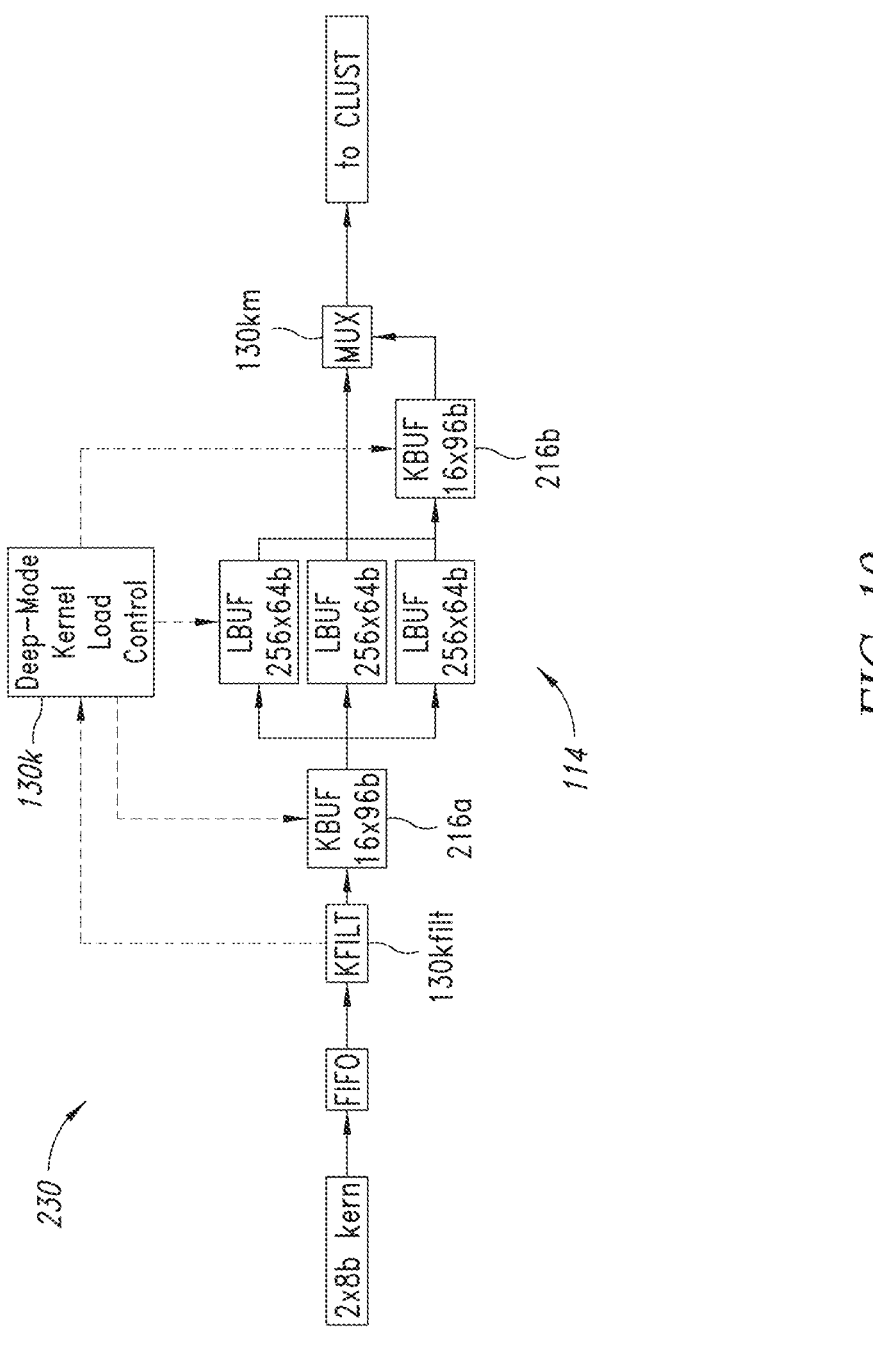
FIG. 19 is a conceptual diagram illustrating a data path of the kernel data in a convolutional accelerator operating in a deep mode of operation according to an embodiment.

FIG. 19 is a conceptual diagram illustrating a data path of the kernel data 230 in a convolutional accelerator operating in a deep mode of operation according to an embodiment. The operation of the elements of the kernel data path is described above with reference to FIG. 15. In each cycle, all 24 kernel values stored in the dual-port memory 216b are supplied to respective MAC units of the 72 MAC units, with each kernel value being supplied to 3 MAC units.

Figure 20:
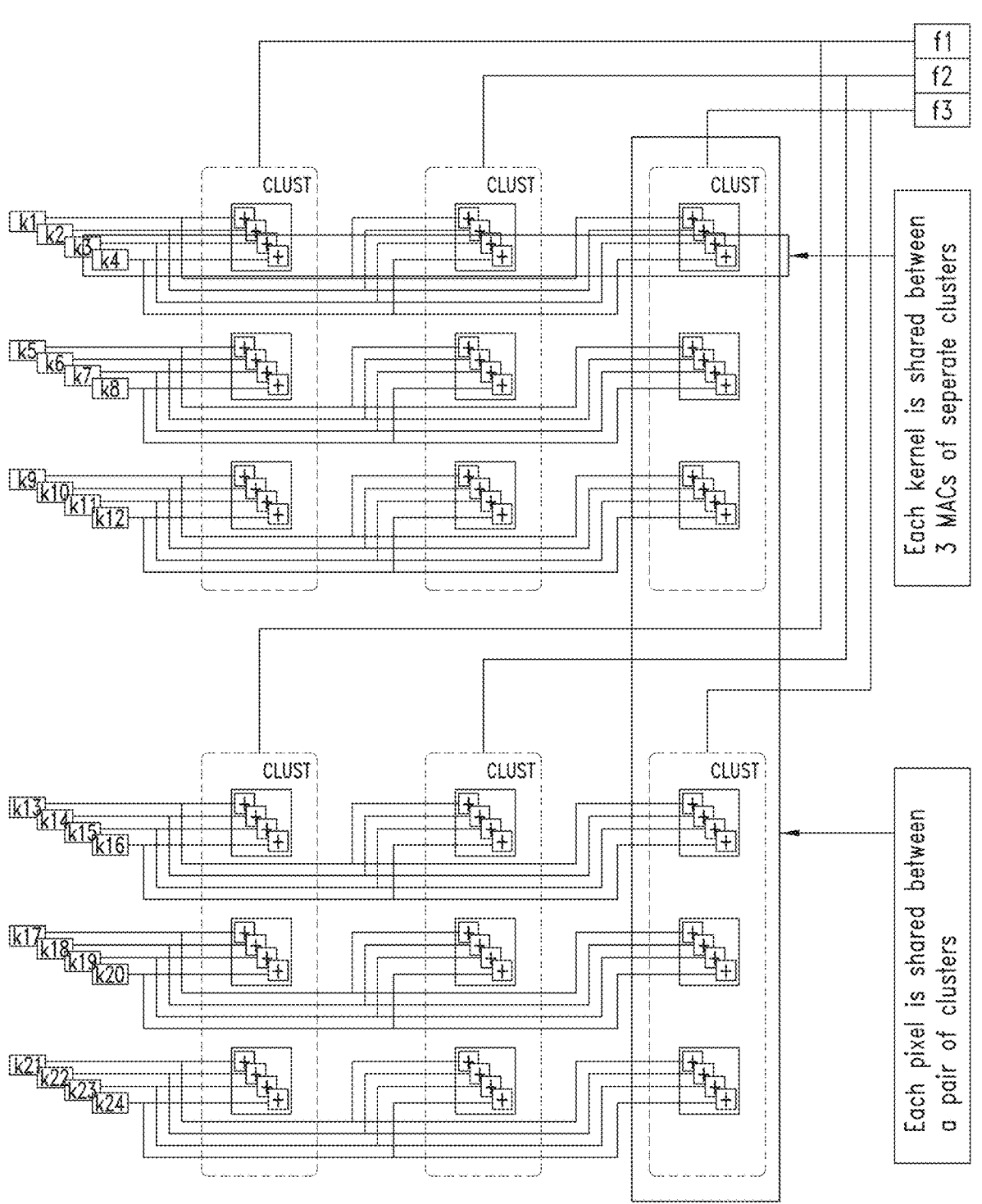
FIG. 20 is a conceptual diagram illustrating the sharing of each kernel value with three MAC units and the sharing of each pixel of feature data with a pair of MAC clusters in a convolutional accelerator operating in a deep mode of operation according to an embodiment.

FIG. 20 is a conceptual diagram illustrating the sharing of each kernel value, twenty-four in the illustrated embodiment, with three MAC units and the sharing of each pixel of feature data with a pair of MAC clusters in a convolutional accelerator operating in a deep mode of operation according to an embodiment, to produce 72 output pixels per cycle. As compared to the embodiment of FIG. 12 in processing a convolutional layer having 1×1 deep kernel, the performance per cycle is tripled and each retrieved kernel value is used on three MAC operations instead of one MAC operation. The additional control logic employed may add a small amount of costs in terms of area (e.g., 2%).

Figure 21:
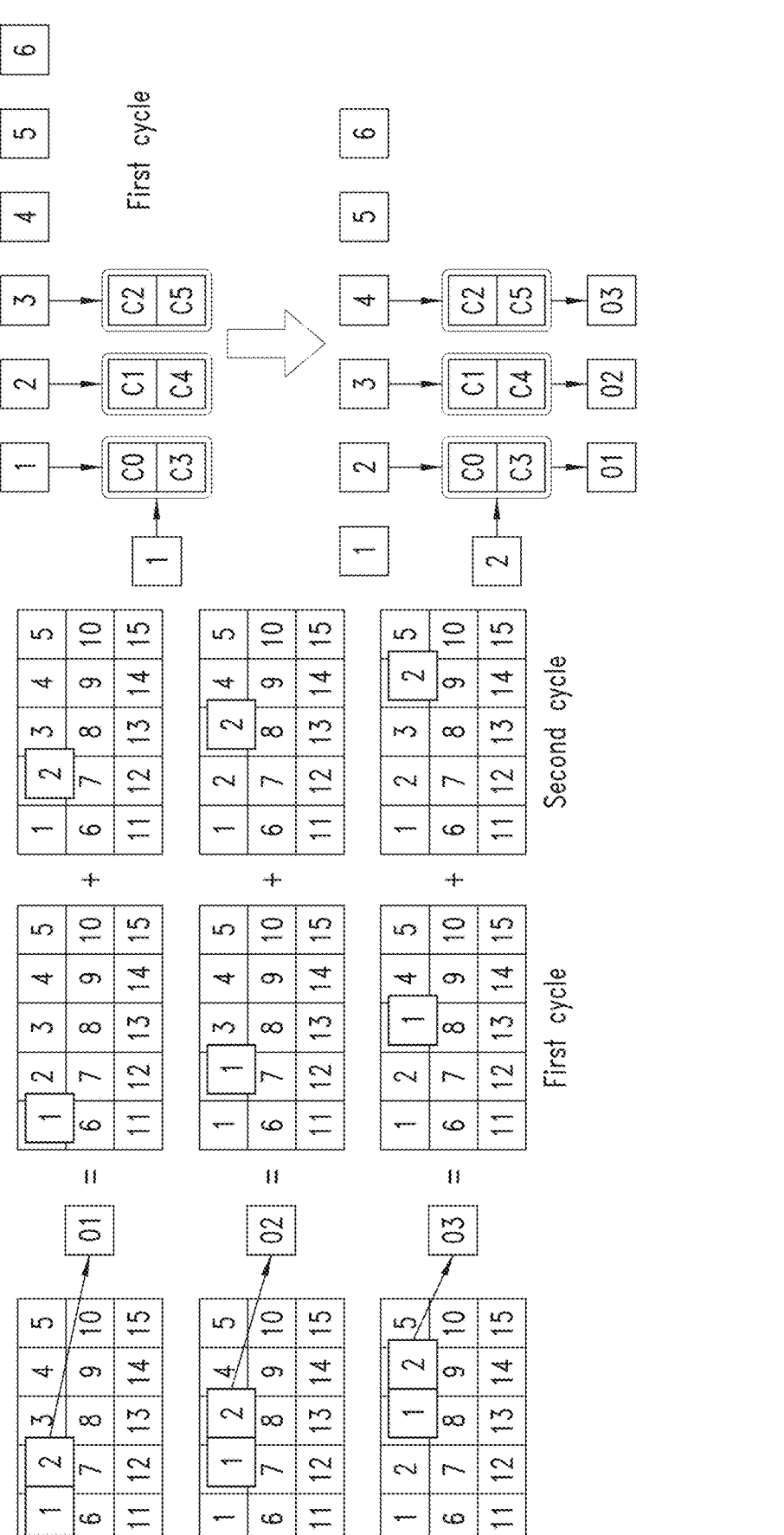
FIG. 21 is a conceptual diagram illustrating convolutional operations associated with a 1×2 kernel in a convolutional accelerator operating in a deep mode of operation according to an embodiment.

FIGS. 14-20 illustrate an embodiment of a deep mode of operation in the context of convolutional processing using a 1×1 kernel. FIG. 21 is a conceptual diagram illustrating convolutional operations associated with a 1×2 kernel in a convolutional accelerator operating in a deep mode of operation according to an embodiment. The 1×2 kernel is decomposed into two 1×1 sub-kernels and the pixel values are strided. The first 1×1 sub-kernel is processed in a first deep mode cycle producing a first partial sum using pixel values 1-3, and the second 1×1 sub-kernel is processed in a second deep mode cycle using pixel values 2-4 producing an accumulated output for the 1×2 kernel.

Figure 22A:
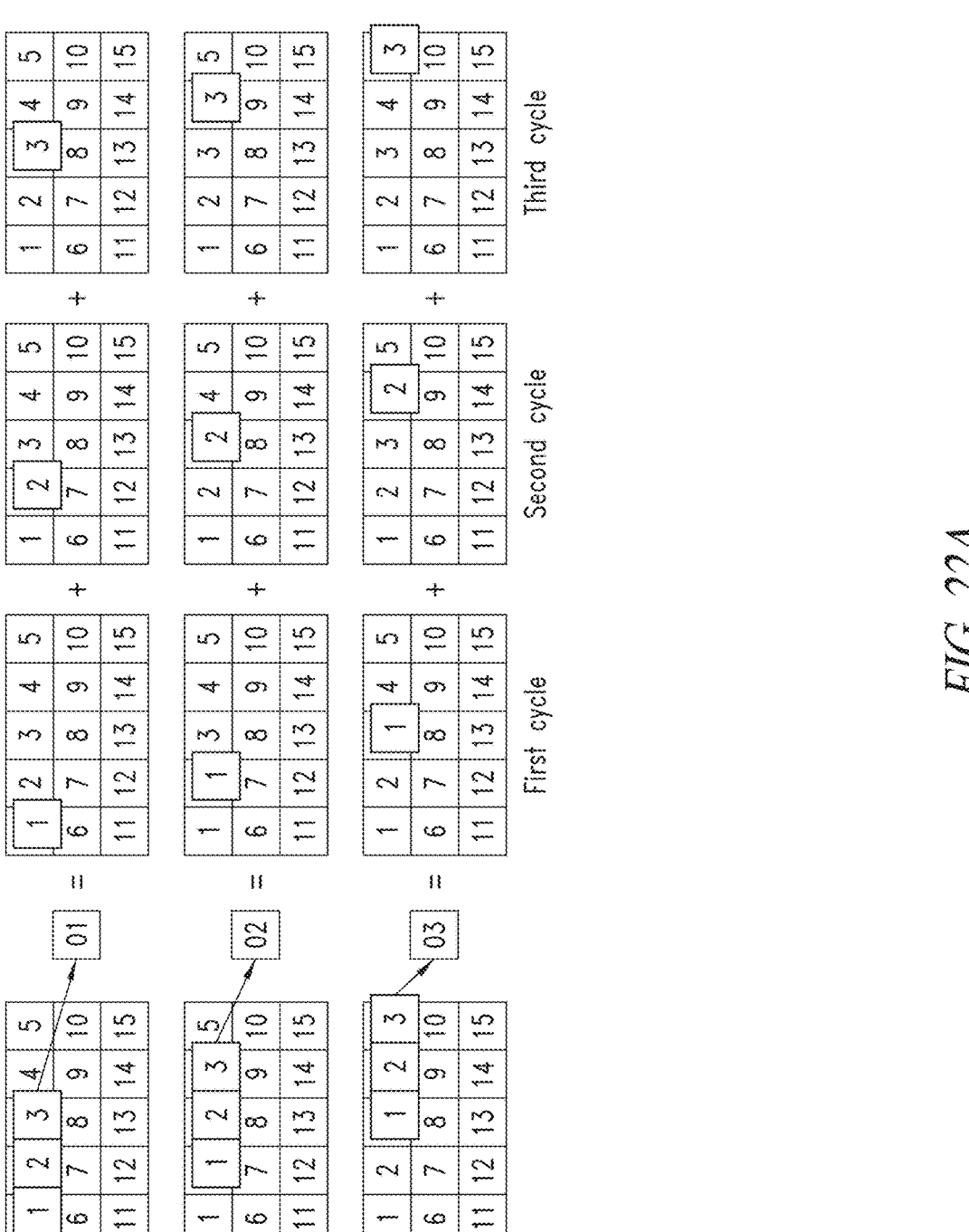
FIGS. 22A and 22B (collectively referred to herein as FIG. 22) are conceptual diagrams illustrating convolutional operations associated with a 1×3 kernel in a convolutional accelerator operating in a deep mode of operation according to an embodiment.
Figure 22B:
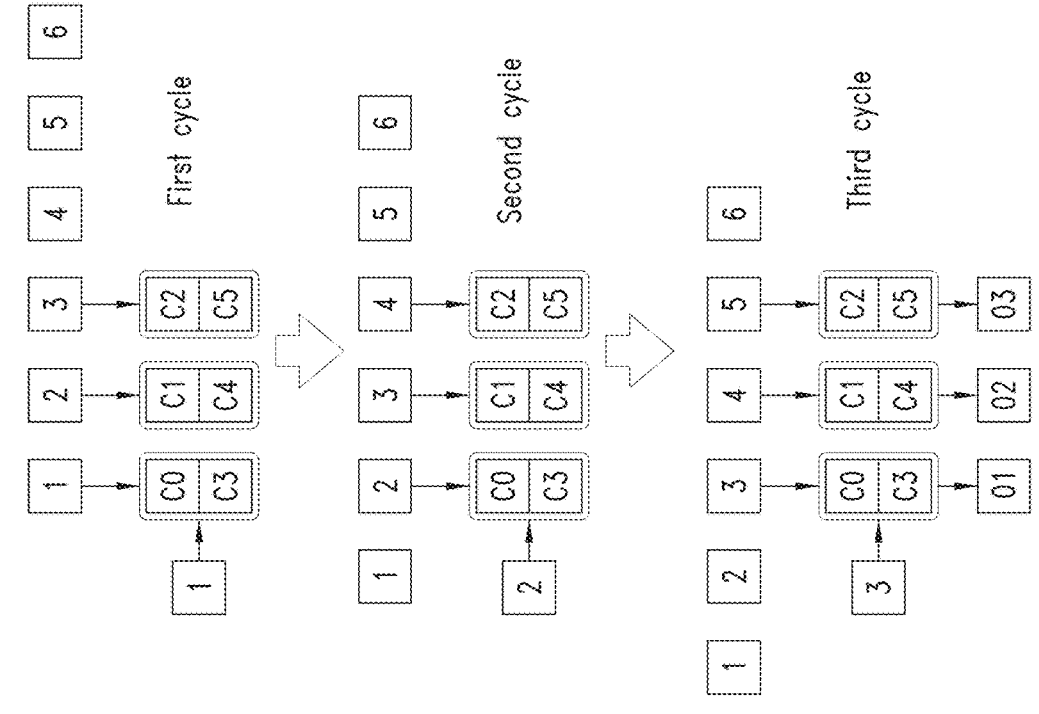

FIG. 22 is a conceptual diagram illustrating convolutional operations associated with a 1×3 kernel in a convolutional accelerator operating in a deep mode of operation according to an embodiment. The 1×2 kernel is decomposed into three 1×1 sub-kernels and the pixel values are strided. The first 1×1 sub-kernel is processed in a first deep mode cycle producing a first partial sum using pixel values 1-3, the second 1×1 sub-kernel is processed in a second deep mode cycle using pixel values 2-4 producing a second partial sum, and the third 1×1 sub-kernel is processed in a third deep mode cycle using pixel values 3-5 producing an accumulated output for the 1×3 kernel. The concept may be extended to convolutional processing with 1×N kernels (e.g., up to the available memory in the feature line buffer 114 for storing kernel depths). Multiple convolutional accelerators may be employed in some embodiments, for example, to process the sub-kernels.

Figure 23:
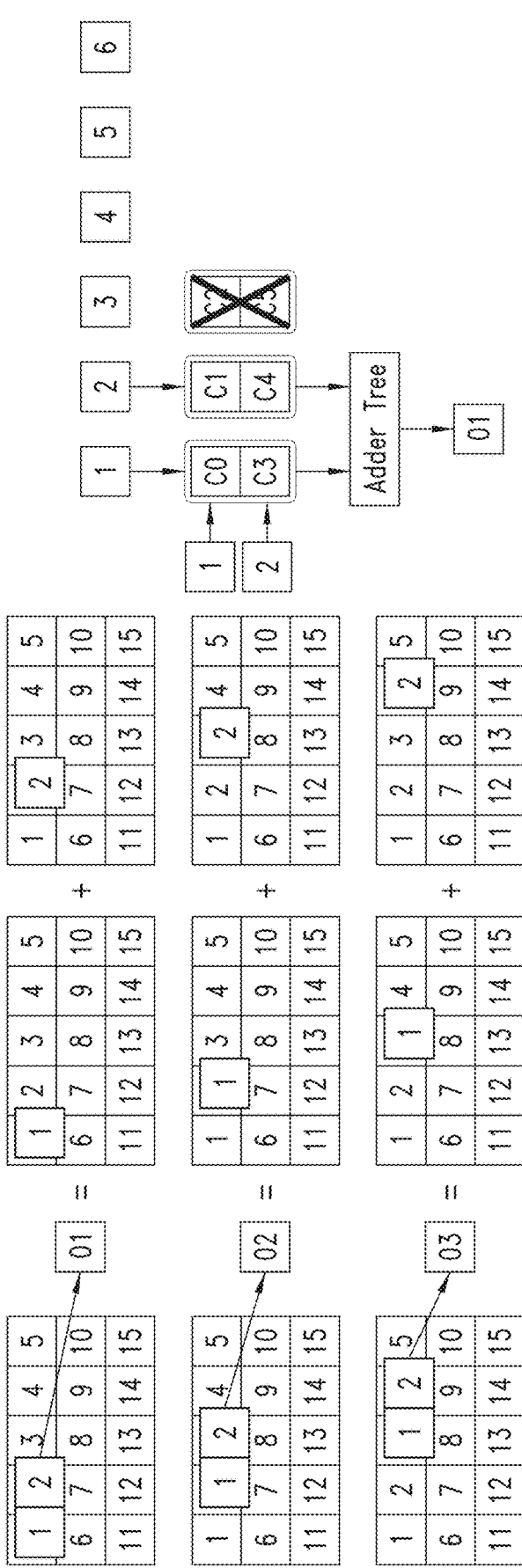
FIG. 23 is a conceptual diagram illustrating convolutional operations associated with a 1×2 kernel in a convolutional accelerator operating in a deep mode of operation using an adder tree according to an embodiment.

FIG. 23 is a conceptual diagram illustrating convolutional operations associated with a 1×2 kernel in a convolutional accelerator operating in a deep mode of operation using an adder tree according to an embodiment. As illustrated, two sub-kernels are each convolved with two pixel values in a cycle and the results are combined using an adder tree, which may reduce latency times associated with accumulating the results of processing of the sub-kernels in sequential cycles.

Figure 24:
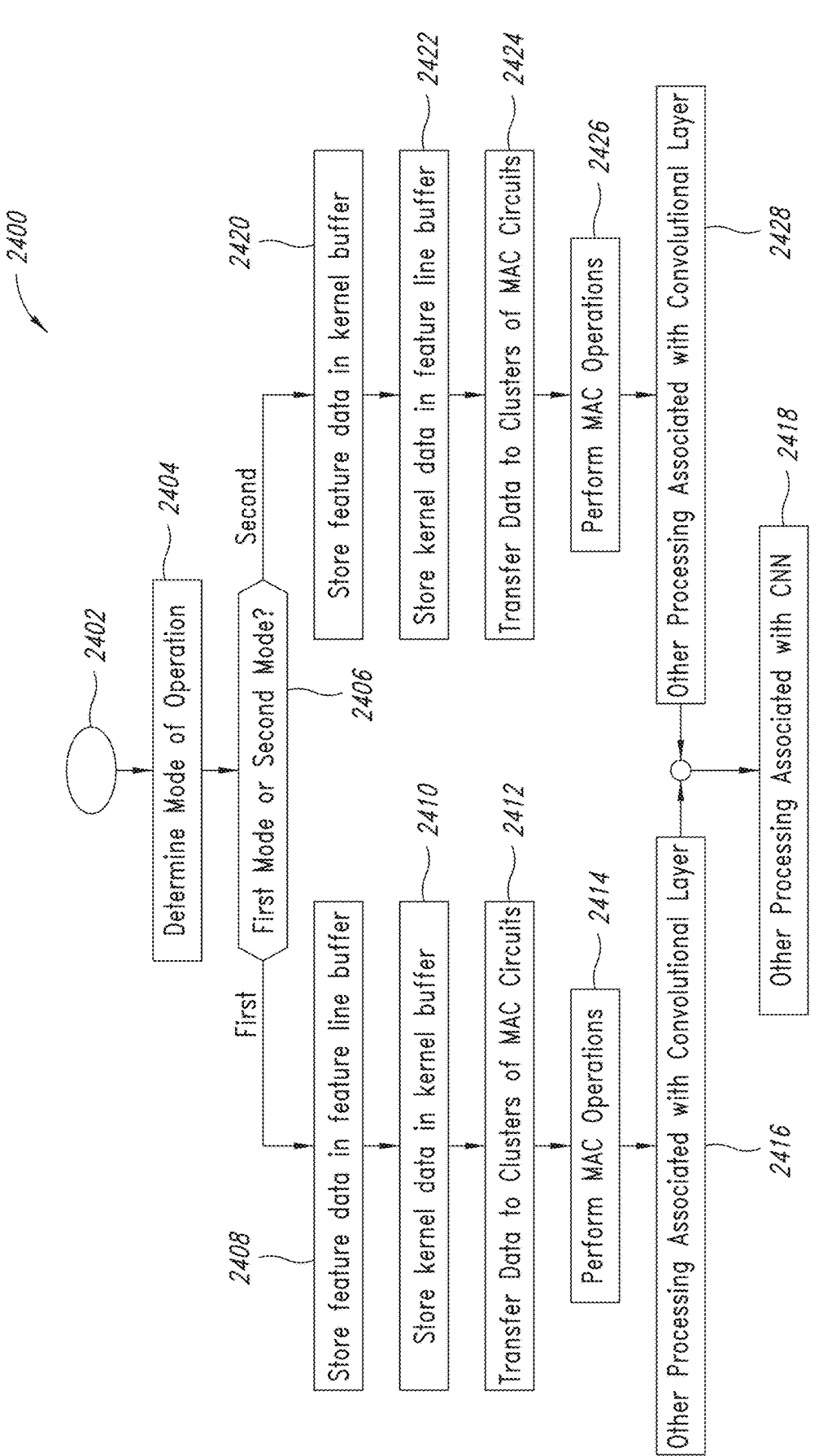
FIG. 24 illustrates a logical flow diagram generally showing an embodiment of a process for controlling a convolutional accelerator in multiple modes of operation.

FIG. 24 illustrates a logical flow diagram generally showing an embodiment of a method 2400 for controlling a convolutional accelerator in multiple modes of operation, which may be performed, for example, by the convolutional accelerator 112 using the mode control circuitry 130 as discussed above with reference to FIGS. 9-23. For convenience, the method 2400 will be described with reference to FIGS. 1-23.

The method 2400 starts at 2402, and proceeds to 2404. At 2404, the method 2400 determines or selects a mode of operation of a convolutional accelerator 112 in processing a convolutional layer. This may be done, for example, based on the size of a kernel to be processed by a convolutional accelerator 112 in the convolutional layer, the configuration of the convolutional accelerator 112 (e.g., the characteristics of the feature line buffer 114, the kernel buffer 116, etc.), and various combinations thereof. For example, if the convolutional accelerator 112 is optimized to process 3×3 kernels (e.g., based on the size and configuration of the kernel buffer 116 and the clusters of MAC circuits 118), and the kernel to be processed is a 2×2 or larger kernel, a first mode of operation, such as a normal mode of operation, may be selected. On the other hand, if the convolutional accelerator 112 is optimized to process 3×3 kernels (e.g., based on the size and configuration of the kernel buffer 116), and the kernel to be processed is a 1×1 to 1×N kernel, where N is an integer greater than or equal to 1, a second mode of operation may be selected, such as a deep mode of operation. Other factors may be considered as well, such as the depth of the kernel. The determination of the mode of operation may be made by a host processor, such as a process 102 of FIG. 9, and stored in a configuration register, such as the configuration register 148 of FIG. 10. The method 2400 proceeds from 2404 to 2406.

At 2406, the method 2400 determines whether the selected mode of operation is a first mode of operation or a second mode of operation, for example, a normal mode of operation or a deep mode of operation, based on the determination at 2404. When it is determined at 2406 that the mode of operation is a first mode of operation, the method 2400 proceeds from 2406 to 2408.

At 2408, the method 2400 stores feature data in the feature line buffer 114. This may be done in a generally conventional manner, such as discussed above with reference to FIGS. 10 and 13. The method proceeds from 2408 to 2410.

At 2410, the method 2400 stores kernel data in the kernel buffer 116. This may be done in a generally conventional manner, such as discussed above with reference to FIGS. 10 and 13. The method proceeds from 2410 to 2412.

At 2412, the method 2400 transfers feature data from the feature line buffer 114 to the MAC clusters 118, and transfers kernel data from the kernel buffer 116 to the MAC clusters 118. This may be done in a generally conventional manner, such as discussed above with reference to FIGS. 10 and 13. The method proceeds from 2412 to 2414.

At 2414, the method 2400 performs MAC operations using the MAC clusters 118 with the feature data and kernel data transferred at 2412. This may be done in a generally conventional manner, such as discussed above with reference to FIGS. 10 and 13. The method proceeds from 2414 to 2416.

At 2416, the method 2400 performs other processing operations associated with the convolutional layer, such as accumulating results of batches of data, serializing output data, returning to 2408 to process a subsequent batch of data of the convolutional layer, transferring data to and from external memory, etc., and various combinations thereof. This may be done in a generally conventional manner, such as discussed above with reference to FIGS. 8, 10 and 13. The method proceeds from 2416 to 2418.

At 2418, the method 2400 performs other processing operations associated with the CNN that includes the convolutional layer, such as returning to 2404 to determine a mode of operation for a next convolutional layer of the CNN, performing pooling operations of a next layer of the CNN, transferring data to and from external memory, etc., and various combinations thereof.

When it is determined at 2406 that the mode of operation is a second mode of operation, for example, a deep kernel mode of operation, the method 2400 proceeds from 2406 to 2420.

At 2420, the method 2400 stores feature data in the kernel buffer 116. This may be done, for example, as discussed above with reference to FIGS. 13-18 and 20. The method proceeds from 2420 to 2422.

At 2422, the method 2400 stores kernel data in the feature line buffer 114. This may be done, for example, as discussed above with reference to FIGS. 13-17, 19 and 20. The method proceeds from 2422 to 2424.

At 2424, the method 2400 transfers feature data from the kernel buffer 116 to the MAC clusters 118, and transfers kernel data from the feature line buffer 114 to the MAC clusters 118. This may be done, for example, as discussed above with reference to FIGS. 13-20. The method proceeds from 2424 to 2426.

At 2426, the method 2400 performs MAC operations using the MAC clusters 118 with the feature data and kernel data transferred at 2424. This may be done in a generally conventional manner. The method proceeds from 2414 to 2416.

At 2428, the method 2400 performs other processing operations associated with the convolutional layer, such as accumulating results of batches of data, serializing output data (e.g., to account for the order in which feature line and kernel data are processed in 2426), returning to 2420 to process a subsequent batch of data of the convolutional layer (see FIG. 8), transferring data to and from external memory, etc., and various combinations thereof. The method proceeds from 2428 to 2418, where, as discussed above, other processing operations associated with the CNN may be performed.

Embodiments of the foregoing processes and methods may contain additional acts not shown in FIG. 24, may not contain all of the acts shown in FIG. 24, may perform acts shown in FIG. 24 in various orders, may combine acts, may split acts into separate acts, and may be otherwise modified in various respects. For example, FIG. 24 may be modified to combine acts 2404 and 2406, to perform acts 2408 and 2410 in parallel, to perform acts 2420 and 2422 in parallel, to include processing acts to facilitate processing of 1×N kernels in the second mode of operation, where N is an integer greater than 1 (see, e.g., FIGS. 21-23), etc, and various combinations thereof.

In an embodiment, a convolutional accelerator comprises a feature line buffer, a kernel buffer separate from the feature line buffer, a Multiply-ACcumulate (MAC) cluster, and mode control circuitry coupled to the feature line buffer, the kernel buffer and the MAC cluster. The mode control circuitry, in a first mode of operation of the convolutional accelerator, stores feature data in the feature line buffer, stores kernel data in the kernel buffer, transfers feature data from the feature line buffer to the MAC cluster, and transfers kernel data from the kernel buffer to the MAC cluster. In a second mode of operation of the convolutional accelerator, the mode control circuitry stores feature data in the kernel buffer, stores kernel data in the feature line buffer, transfers feature data from the kernel buffer to the MAC cluster, and transfers kernel data from the feature line buffer to the MAC cluster. The second mode of operation may be employed to efficiently process 1×N kernels, where N is an integer greater than or equal to 1.

In an embodiment, the mode control circuitry, in the first mode of operation: stores three lines of feature line data having a depth of up to 1024 elements in the feature line buffer; and stores 3×3 kernels in the kernel buffer. In an embodiment, the mode control circuitry, in the second mode of operation: stores six lines of feature line data having a depth of up to 128 elements in the kernel buffer; and stores 1×1 kernels in the feature line buffer. In an embodiment, the mode control circuitry, in the second mode of operation: transfers three lines of feature line data from the kernel buffer to the MAC clusters in a cycle; and transfers twenty-four kernel data values to the MAC clusters in the cycle. In an embodiment, the MAC clusters, in operation, generate 72 output values in the cycle.

In an embodiment, the feature line buffer is a single-port memory, and the kernel buffer comprises a plurality of dual-port buffers. In an embodiment, the mode control circuitry, in the second mode of operation: stores feature line data in a first subset of the plurality of dual-port buffers; and buffers kernel data is a second subset of the plurality of dual-port buffers. In an embodiment, the buffering kernel data in the second subset of the plurality of dual-port buffers comprises: storing kernel data in a first dual-port buffer of the second subset; transferring kernel data from the first dual-port buffer of the second subset to the feature line buffer; transferring kernel data from the feature line buffer to a second dual-port buffer of the second subset; and transferring kernel data from the second dual-port buffer of the second subset to the MAC clusters. In an embodiment, the buffering kernel data in the second subset of the plurality of dual-port buffers comprises: transferring kernel data from the feature line buffer to a dual-port buffer of the second subset of dual-port buffers; and transferring kernel data from the dual-port buffer of the second subset of dual-port buffers to the MAC clusters. In an embodiment, the mode control circuitry, in the second mode of operation, serializes output values generated by the MAC clusters.

In an embodiment, the convolutional accelerator comprises a configuration register, and the mode control circuitry, in operation, determines whether to operate in the first mode of operation or the second mode of operation based on a configuration parameter stored in the configuration register. In an embodiment, in the second mode of operation, the kernel data has a size of 1×N, where N is an integer greater than or equal to 1.

In an embodiment, a system comprises a stream engine, which, in operation, streams feature and kernel data, and a convolutional accelerator coupled to the stream engine, wherein the convolutional accelerator, in operation, receives streams of feature and kernel data from the stream engine. The convolutional accelerator includes a feature line buffer, a kernel buffer, a multiply-accumulate cluster coupled to the feature line buffer and the kernel buffer, mode control circuitry coupled to the feature line buffer, the kernel buffer and the MAC cluster. The mode control circuitry, in a first mode of operation of the convolutional accelerator, stores feature data in the feature line buffer, stores kernel data in the kernel buffer, transfers feature data from the feature line buffer to the MAC cluster, and transfers kernel data from the kernel buffer to the MAC cluster. In a second mode of operation of the convolutional accelerator, the mode control circuitry stores feature data in the kernel buffer, stores kernel data in the feature line buffer, transfers feature data from the kernel buffer to the MAC cluster, and transfers kernel data from the feature line buffer to the MAC cluster. The second mode of operation may be employed to efficiently process 1×N kernels, where N is an integer greater than or equal to 1.

In an embodiment, the mode control circuitry: in the first mode of operation: stores three lines of feature line data having a depth of up to 1024 elements in the feature line buffer; and in the second mode of operation: stores six lines of feature line data having a depth of up to 128 elements in the kernel buffer; and stores 1×N kernels in the feature line buffer, where N is an integer greater than or equal to 1. In an embodiment, the mode control circuitry, in the second mode of operation: transfers three lines of feature line data from the kernel buffer to the MAC clusters in a cycle; and transfers twenty-four kernel data values to the MAC clusters in the cycle. In an embodiment, the feature line buffer is a single-port memory; and the kernel buffer comprises a plurality of dual-port buffers. In an embodiment, the mode control circuitry, in the second mode of operation: stores feature line data in a first subset of the plurality of dual-port buffers; and buffers kernel data is a second subset of the plurality of dual-port buffers.

In an embodiment, a method comprises streaming feature data and kernel data to a convolutional accelerator, and convolving streamed kernel data with streamed feature data. The convolving includes, in a first mode of operation of the convolutional accelerator, storing feature data in a feature line buffer of the convolutional accelerator, storing kernel data in a kernel buffer of the convolutional accelerator, transferring feature data from the feature line buffer to a MAC cluster of the convolutional accelerator, and transferring kernel data from the kernel buffer to the MAC cluster. In a second mode of operation of the convolutional accelerator the convolving includes storing feature data in the kernel buffer, storing kernel data in the feature line buffer, transferring feature data from the kernel buffer to the MAC cluster, and transferring kernel data from the feature line buffer to the MAC cluster. The second mode of operation may be employed to efficiently process 1×N kernels, where N is an integer greater than or equal to 1.

In an embodiment, the first mode of operation includes storing three lines of feature line data having a depth of up to 1024 elements in the feature line buffer, and storing 3×3 kernels in the kernel buffer; and the second mode of operation includes storing six lines of feature line data having a depth of up to 128 elements in the kernel buffer, and storing 1×N kernels in the feature line buffer, where N is an integer greater than or equal to 1. In an embodiment, the kernel buffer comprises a plurality of dual-port buffers; and in the second mode of operation: the storing feature data in the kernel buffer comprises storing feature data in a first subset of the plurality of dual-port buffers; and the storing kernel data in the feature line buffer comprising buffering kernel data is a second subset of the plurality of dual-port buffers.

In an embodiment, a non-transitory computer-readable medium's contents configure a convolutional accelerator having a plurality of modes of operation to convolve streamed kernel data with streamed feature data. The convolving includes, in a first mode of operation of the plurality of modes of operation of the convolutional accelerator, storing feature data in a feature line buffer of the convolutional accelerator, storing kernel data in a kernel buffer of the convolutional accelerator, transferring feature data from the feature line buffer to a MAC cluster of the convolutional accelerator, and transferring kernel data from the kernel buffer to the MAC cluster. In a second mode of operation of the plurality of modes of operation of the convolutional accelerator, the convolving includes storing feature data in the kernel buffer, storing kernel data in the feature line buffer, transferring feature data from the kernel buffer to the MAC cluster, and transferring kernel data from the feature line buffer to the MAC cluster. The second mode of operation may be employed to efficiently process 1×N kernels, where N is an integer greater than or equal to 1. In an embodiment, in the first mode of operation the convolving includes storing three lines of feature line data having a depth of up to 1024 elements in the feature line buffer, and storing 3×3 kernels in the kernel buffer; and in the second mode of operation the convolving includes storing six lines of feature line data having a depth of up to 128 elements in the kernel buffer, and storing 1×N kernels in the feature line buffer, where N is an integer greater than or equal to 1. In an embodiment, the kernel buffer comprises a plurality of dual-port buffers; and in the second mode of operation: the storing feature data in the kernel buffer comprises storing feature data in a first subset of the plurality of dual-port buffers; and the storing kernel data in the feature line buffer comprises buffering kernel data is a second subset of the plurality of dual-port buffers. In an embodiment, the contents comprise instructions executed by the convolutional accelerator.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A convolutional accelerator, comprising:
a feature line buffer;
a kernel buffer separate from the feature line buffer;
a Multiply-ACcumulate (MAC) cluster; and
mode control circuitry coupled to the feature line buffer, the kernel buffer and the MAC cluster, wherein the mode control circuitry:
in a first mode of operation of the convolutional accelerator:
stores feature data in the feature line buffer;
stores kernel data in the kernel buffer;
transfers feature data from the feature line buffer to the MAC cluster; and
transfers kernel data from the kernel buffer to the MAC cluster; and
in a second mode of operation of the convolutional accelerator:
stores feature data in the kernel buffer;
stores kernel data in the feature line buffer;
transfers feature data from the kernel buffer to the MAC cluster; and
transfers kernel data from the feature line buffer to the MAC cluster.

2. The convolutional accelerator of claim 1, wherein the mode control circuitry, in the first mode of operation:
stores three lines of feature line data having a depth of up to 1024 elements in the feature line buffer; and
stores 3×3 kernels in the kernel buffer.

3. The convolutional accelerator of claim 2, wherein the mode control circuitry, in the second mode of operation:
stores six lines of feature line data having a depth of up to 128 elements in the kernel buffer; and
stores 1×1 kernels in the feature line buffer.

4. The convolutional accelerator of claim 3, wherein the mode control circuitry, in the second mode of operation:
transfers three lines of feature line data from the kernel buffer to the MAC clusters in a cycle; and
transfers twenty-four kernel data values to the MAC clusters in the cycle.

5. The convolutional accelerator of claim 4, wherein the MAC clusters, in operation, generate 72 output values in the cycle.

6. The convolutional accelerator of claim 1, wherein:
the feature line buffer is a single-port memory; and
the kernel buffer comprises a plurality of dual-port buffers.

7. The convolutional accelerator of claim 6, wherein the mode control circuitry, in the second mode of operation:
stores feature line data in a first subset of the plurality of dual-port buffers; and
buffers kernel data in a second subset of the plurality of dual-port buffers.

8. The convolutional accelerator of claim 7, wherein the buffering kernel data in the second subset of the plurality of dual-port buffers comprises:
storing kernel data in a first dual-port buffer of the second subset;
transferring kernel data from the first dual-port buffer of the second subset to the feature line buffer;
transferring kernel data from the feature line buffer to a second dual-port buffer of the second subset; and
transferring kernel data from the second dual-port buffer of the second subset to the MAC clusters.

9. The convolutional accelerator of claim 7, wherein the buffering kernel data in the second subset of the plurality of dual-port buffers comprises:
transferring kernel data from the feature line buffer to a dual-port buffer of the second subset of dual-port buffers; and transferring kernel data from the dual-port buffer of the second subset of dual-port buffers to the MAC clusters.

10. The convolutional accelerator of claim 1, wherein the mode control circuitry, in the second mode of operation, serializes output values generated by the MAC clusters.

11. The convolutional accelerator of claim 1, comprising a configuration register, wherein the mode control circuitry, in operation, determines whether to operate in the first mode of operation or the second mode of operation based on a configuration parameter stored in the configuration register.

12. The convolutional accelerator of claim 1, wherein in the second mode of operation, the kernel data has a size of $1 \times N$, where N is an integer greater than or equal to 1.

13. A system, comprising:
a stream engine, which, in operation, streams feature and kernel data; and
a convolutional accelerator coupled to the stream engine, wherein the convolutional accelerator, in operation, receives streams of feature and kernel data from the stream engine, the convolutional accelerator including:
a feature line buffer;
a kernel buffer;
a Multiply-ACcumulate (MAC) cluster coupled to the feature line buffer and the kernel buffer; and
mode control circuitry coupled to the feature line buffer, the kernel buffer and the MAC cluster, wherein the mode control circuitry:
in a first mode of operation of the convolutional accelerator:
stores feature data in the feature line buffer;
stores kernel data in the kernel buffer;
transfers feature data from the feature line buffer to the MAC cluster; and
transfers kernel data from the kernel buffer to the MAC cluster; and
in a second mode of operation of the convolutional accelerator:
stores feature data in the kernel buffer;
stores kernel data in the feature line buffer;
transfers feature data from the kernel buffer to the MAC cluster; and
transfers kernel data from the feature line buffer to the MAC cluster.

14. The system of claim 13, wherein the mode control circuitry:
in the first mode of operation:
stores three lines of feature line data having a depth of up to 1024 elements in the feature line buffer; and
in the second mode of operation:
stores six lines of feature line data having a depth of up to 128 elements in the kernel buffer; and
stores $1 \times N$ kernels in the feature line buffer, where N is an integer greater than or equal to 1.

15. The system of claim 14, wherein the mode control circuitry, in the second mode of operation:
transfers three lines of feature line data from the kernel buffer to the MAC clusters in a cycle; and
transfers twenty-four kernel data values to the MAC clusters in the cycle.

16. The system of claim 13, wherein:
the feature line buffer is a single-port memory; and
the kernel buffer comprises a plurality of dual-port buffers.

17. The system of claim 16, wherein the mode control circuitry, in the second mode of operation:
stores feature line data in a first subset of the plurality of dual-port buffers; and buffers kernel data in a second subset of the plurality of dual-port buffers.

18. A method, comprising:
streaming feature data and kernel data to a convolutional accelerator; and
convolving streamed kernel data with streamed feature data, the convolving including:
in a first mode of operation of the convolutional accelerator:
storing feature data in a feature line buffer of the convolutional accelerator;
storing kernel data in a kernel buffer of the convolutional accelerator;
transferring feature data from the feature line buffer to a MAC cluster of the convolutional accelerator; and
transferring kernel data from the kernel buffer to the MAC cluster; and
in a second mode of operation of the convolutional accelerator:
storing feature data in the kernel buffer;
storing kernel data in the feature line buffer;
transferring feature data from the kernel buffer to the MAC cluster; and
transferring kernel data from the feature line buffer to the MAC cluster.

19. The method of claim 18, wherein:
the first mode of operation includes storing three lines of feature line data having a depth of up to 1024 elements in the feature line buffer, and storing $3 \times 3$ kernels in the kernel buffer; and
the second mode of operation includes storing six lines of feature line data having a depth of up to 128 elements in the kernel buffer, and storing $1 \times N$ kernels in the feature line buffer, where N is an integer greater than or equal to 1.

20. The method of claim 18, wherein:
the kernel buffer comprises a plurality of dual-port buffers; and
in the second mode of operation:
the storing feature data in the kernel buffer comprises storing feature data in a first subset of the plurality of dual-port buffers; and
the storing kernel data in the feature line buffer comprising buffering kernel data in a second subset of the plurality of dual-port buffers.

21. A non-transitory computer-readable medium having contents which configure a convolutional accelerator having a plurality of modes of operation to convolve streamed kernel data with streamed feature data, the convolving including:
in a first mode of operation of the plurality of modes of operation of the convolutional accelerator:
storing feature data in a feature line buffer of the convolutional accelerator;
storing kernel data in a kernel buffer of the convolutional accelerator;
transferring feature data from the feature line buffer to a MAC cluster of the convolutional accelerator; and
transferring kernel data from the kernel buffer to the MAC cluster; and
in a second mode of operation of the plurality of modes of operation of the convolutional accelerator:
storing feature data in the kernel buffer;
storing kernel data in the feature line buffer;
transferring feature data from the kernel buffer to the MAC cluster; and transferring kernel data from the feature line buffer to the MAC cluster.

22. The non-transitory computer-readable medium of claim 21, wherein:

in the first mode of operation the convolving includes storing three lines of feature line data having a depth of up to 1024 elements in the feature line buffer, and storing 3×3 kernels in the kernel buffer; and in the second mode of operation the convolving includes storing six lines of feature line data having a depth of up to 128 elements in the kernel buffer, and storing 1×N kernels in the feature line buffer, where N is an integer greater than or equal to 1.

23. The non-transitory computer-readable medium of claim 21, wherein:

the kernel buffer comprises a plurality of dual-port buffers; and in the second mode of operation:

the storing feature data in the kernel buffer comprises storing feature data in a first subset of the plurality of dual-port buffers; and the storing kernel data in the feature line buffer comprises buffering kernel data in a second subset of the plurality of dual-port buffers.

24. The non-transitory computer-readable medium of claim 21, wherein the contents comprise instructions executed by the convolutional accelerator.

\*   \*   \*   \*   \*